US012742062B2

(12) United States Patent
Bellehumeur et al.

(10) Patent No.: US 12,742,062 B2
(45) Date of Patent: Sep. 22, 2026

(54) BIMODAL POLYETHYLENE COMPOSITION

(71) Applicant: NOVA Chemicals (International) S.A., Fribourg (CH)

(72) Inventors: Céline Bellehumeur, Calgary (CA); Sepideh Kasiri, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 699 days.

(21) Appl. No.: 18/259,114

(22) PCT Filed: Jan. 21, 2022

(86) PCT No.: PCT/IB2022/050561

§ 371 (c)(1),
(2) Date: Jun. 23, 2023

(87) PCT Pub. No.: WO2022/180457

PCT Pub. Date: Sep. 1, 2022

(65) Prior Publication Data

US 2024/0301182 A1 Sep. 12, 2024

Related U.S. Application Data

(60) Provisional application No. 63/153,311, filed on Feb. 24, 2021.

(51) Int. Cl.
*C08L 23/08* (2025.01)

(52) U.S. Cl.
CPC .......... *C08L 23/08* (2013.01); *C08L 2203/14* (2013.01); *C08L 2205/025* (2013.01); *C08L 2207/07* (2013.01)

(58) Field of Classification Search
None
See application file for complete search history.

(56) References Cited

U.S. PATENT DOCUMENTS 5,342,868 A 8/1994 Kimura et al.
5,350,807 A 9/1994 Pettijohn et al.
5,530,055 A 6/1996 Needham
5,744,551 A 4/1998 Kupperblatt et al.
5,981,636 A 11/1999 Amos et al.
6,372,864 B1 4/2002 Brown
6,444,733 B1 9/2002 Stadler
6,448,341 B1 9/2002 Kolthammer et al.
6,465,551 B1 10/2002 Zhao et al.
6,599,971 B2 7/2003 Dotson et al.
6,777,509 B2 8/2004 Brown et al.
6,969,741 B2 11/2005 Lustiger et al.
7,022,770 B2 4/2006 Lustiger et al.
7,153,909 B2 12/2006 Van Dun et al.
7,250,474 B2 7/2007 Maziers
7,307,126 B2 12/2007 Lustiger et al.
7,396,878 B2 7/2008 Lustiger et al.
7,396,881 B2 7/2008 Lustiger et al.
8,022,143 B2 9/2011 Wang
8,114,946 B2 2/2012 Yang et al.
8,475,899 B2 7/2013 Yang et al.
8,476,370 B2 7/2013 Backman et al.
8,492,498 B2 7/2013 Buck et al.
8,674,024 B2 3/2014 Buryak et al.
8,759,448 B2 6/2014 Buryak et al.
8,829,115 B2 9/2014 Hermel-Davidock et al.
8,859,066 B2 10/2014 Johansson et al.
8,962,755 B2 2/2015 Wang et al.
9,056,970 B2 6/2015 Davis et al.
9,074,082 B2 7/2015 Wang et al.
9,102,819 B2 8/2015 Kapur et al.
9,115,275 B2 8/2015 Kupar et al.
9,169,337 B2 10/2015 Rohatgi et al.
9,181,422 B2 11/2015 Bellehumeur et al.
9,221,966 B2 12/2015 Wang et al.
9,228,038 B2 1/2016 Kwon et al.
9,371,442 B2 6/2016 Wang
9,475,927 B2 10/2016 Wang et al.
9,505,893 B2 11/2016 Wang et al.
9,540,505 B2 1/2017 Bellehumeur et al.
9,631,059 B2 4/2017 Demirors et al.

(Continued)

FOREIGN PATENT DOCUMENTS

EP 1 197 501 A2 4/2002
JP 2003-286373 A 10/2003

(Continued)

OTHER PUBLICATIONS

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).
ASTM D1693-13—Standard Test Method for Environmental Stress-Cracking of Ethylene Plastics—Copyright ASTM International—Current edition approved Apr. 1, 2013. Published Apr. 2013. Originally approved in 1959. Last previous edition approved in 2012 as D1693-12 (pp. 1-11).
Astm D1822-13—Standard Test Method for Tensile-Impact Energy to Break Plastics and Electrical Insulating Materials—Copyright ASTM International—Current edition approved Sep. 1, 2013. Published Nov. 2013. Originally approved in 1961. Last previous edition approved in 2006 as D1822-06 (pp. 1-11).

(Continued)

*Primary Examiner* — Michael J Feely
(74) *Attorney, Agent, or Firm* — Thomas J. Styslinger

(57) ABSTRACT

A bimodal polyethylene composition has a density of from 0.940 to 0.949 g/cm$^3$, a melt index, $I_2$ of greater than 5 g/10 min and an environmental stress crack resistance, ESCR of greater than 1000 hours as determined by ASTM D1693 in 100% IGEPAL CO-630 under condition B. The bimodal polyethylene composition which comprises a first ethylene copolymer and a second ethylene copolymer is relatively easy to process and may be used to make molded articles.

29 Claims, 6 Drawing Sheets

(56) References Cited

U.S. PATENT DOCUMENTS

| | | | |
|---|---|---|---|
| 9,637,628 | B2 | 5/2017 | Wang |
| 9,695,309 | B2 | 7/2017 | Bellehumeur et al. |
| 9,751,998 | B2 | 9/2017 | Klosin et al. |
| 9,758,653 | B2 | 9/2017 | Wang et al. |
| 9,783,663 | B2 | 10/2017 | Wang |
| 10,023,706 | B2 | 7/2018 | Bellehumeur et al. |
| 10,053,564 | B2 | 8/2018 | Wang et al. |
| 10,329,412 | B2 | 6/2019 | Wang et al. |
| 10,442,921 | B2 | 10/2019 | Zhang et al. |
| 10,519,304 | B2 | 12/2019 | Wang |
| 11,286,379 | B2 | 3/2022 | Bellehumeur et al. |
| 2002/0198340 | A1 | 12/2002 | Oi |
| 2004/0014895 | A1* | 1/2004 | Farley ................ C08L 23/0815 525/240 |
| 2010/0133714 | A1 | 6/2010 | Jaker et al. |
| 2016/0229964 | A1 | 8/2016 | Bellehumeur et al. |
| 2017/0267822 | A1 | 9/2017 | Bellehumeur et al. |
| 2021/0324185 | A1* | 10/2021 | Li ...................... C08L 23/0815 |
| 2022/0289953 | A1 | 9/2022 | Bellehumeur et al. |
| 2023/0159732 | A1 | 5/2023 | Bellehumeur et al. |

FOREIGN PATENT DOCUMENTS

| | | | |
|---|---|---|---|
| JP | 2004-131577 | A | 4/2004 |
| JP | 2012-162644 | A | 8/2012 |
| WO | WO-03/033587 | A1 | 4/2003 |
| WO | WO-2011/050042 | A1 | 4/2011 |
| WO | WO-2015/042561 | A1 | 3/2015 |
| WO | WO-2015/042562 | A1 | 3/2015 |
| WO | WO-2015/042563 | A1 | 3/2015 |
| WO | WO-2020/240401 | A1 | 5/2020 |

OTHER PUBLICATIONS

ASTM D256-10—Standard Test Method for Determining the Izod Pendulum Impact Resistance of Plastics—Copyright ASTM International—Current edition approved Nov. 1, 2018. Published Nov. 2018. Originally approved in 1926. Last previous edition approved in 2010 as D256-10 (pp. 1-20).

ASTM D3124-98—Standard Test Method for Vinylidene Unsaturation in Polyethylene by Infrared Spectrophotometry—Copyright ASTM International—Current edition approved Mar. 10, 1998. Published Dec. 1998. Originally published as D3124-72. Last previous edition D3124-93 (pp. 1-4).

ASTM D4703-16—Standard Practice for Compression Molding Thermoplastic Materials into Test Specimens, Plaques, or Sheets—Copyright ASTM International—Current edition approved Apr. 1, 2016. Published Apr. 2016. Originally approved in 1991. Last previous edition approved in 2010 as D4703-10a. (pp. 1-13).

ASTM D6248-98—Standard Test Methods for Vinyl and Trans Unsaturation in Polyethylene by Infrared Spectrophotometry—Copyright ASTM International—Current edition approved May 1, 2012. Published Jul. 2012. Originally approved in 1998. Last previous edition approved in 2004 as D6248-98 (pp. 1-3).

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. (pp. 1-6).

ASTM D6645-01—Standard Test Method for Methyl (Comonomer) Content in Polyethylene by Infrared Spectrophotometry—Copyright ASTM International—Current edition approved Jan. 1, 2010. Published Jan. 2010. Originally approved in 2001. Last previous edition approved in 2001 as D6645-01 (pp. 1-4).

ASTM D790-10—Standard Test Method for Flexural Properties of Unreinforced and Reinforced Plastics and Electrical Insulating Materials—Copyright ASTM International—Current edition approved Apr. 1, 2010. Published Apr. 2010. Originally approved in 1970. Last previous edition approved in 2007 as D790-07 (pp. 1-11).

ASTM D792-13—Standard Test Methods for Density and Specific Gravity (Relative Density) of Plastics by Displacement—Copyright ASTM International—Current edition approved Nov. 1, 2013. Published Nov. 2013. Originally approved in 1944. Last previous edition approved in 2008 as D792-08 (pp. 1-6).

Bird et al., "Dynamics of Polymer Liquids. vol. 1: Fluid Mechanics", John Wiley & Sons, 1987, pp. 169-175.

Deslauriers et al., "Quantifying short chain branching microstructures in ethylene 1-olefin copolymers using size exclusion chromatography and Fourier transform infrared spectroscopy (SEC-FTIR)", Polymer, vol. 43, 2002, pp. 159-170.

Graessley et al., "Effect of Long Branches on the Flow Properties of Polymers", Acc. Chem. Res., vol. 10, 1977, pp. 332-339.

International Search Report and Written Opinion on PCT/IB2022/050561 dtd May 11, 2022.

Marin et al., "Oscillatory Rheometry", Chapter 10 of the book on Rheological Measurement, edited by A. A. Collyer and D. W. Clegg, Elsevier, 1988.

Nomura et al., "Efficient Incorporation of Vinylcylohexane in Ethylene/Vinylcylohexane Copolymerization Catalyzed by Nonbridged Half-Titanocenes", Macromolecules, vol. 38, No. 20, 2005, pp. 8121-8123.

Randall et al., "A Review of High Resolution Liquid 13Carbon Nuclear Magnetic Resonance Characterizations of Ethylene-Based Polymers", JMS—Rev. Macromol. Chem. Phys., 1989, pp. 201-317.

Rudin et al., "Basic Principles of Polymer Molecular Weights", The Elements of Polymer Science & Engineering, 2013, pp. 63-87.

Wang et al., "Rotational Molding of Polypropylene/Ultra-Low-Density Ethylene-a-Olefin Copolymer Blends", Polymer Engineering and Science, vol. 44, 2004, pp. 1662-1669.

Wild et al., "Determination of Branching Distributions in Polyethylene and Ethylene Copolymers", J. Polym. Sci., Part B, Polym. Phys., vol. 20 (3), pp. 441-455 (No Date).

Yau et al., "Application of Triple-Detector Size Exclusion Chromatography (On-Line Differential Refractometer, Viscometer and Light Scattering Detectors) for the Characterization of Brominated Polystyrene", Int'l J Polymer Analysis and Characterization, vol. 2, 1996, pp. 151-171.

* cited by examiner

BIMODAL POLYETHYLENE COMPOSITION

CROSS-REFERENCE TO RELATED APPLICATIONS

This application is a U.S. National Phase Application under 35 U.S.C. 371 of International Patent Application No. PCT/IB2022/050561, filed on Jan. 21, 2022, which in turn claims priority to and the benefit of U.S. Provisional Application No. 63/153,311, filed on Feb. 24, 2021, both of which are incorporated herein by reference in their entirety.

TECHNICAL FIELD

The present disclosure is directed to bimodal polyethylene compositions which flow well, have a density in the range of from 0.940 to 0.949 g/cm$^3$ and which have good environmental stress crack resistance (ESCR performance).

BACKGROUND ART

When developing a thermoplastic resin suitable for use in preparing a molded article such as a rotomolded article, some of the main considerations include: the time required to mold the part (which includes for example, the flow rate of the molten resin within a mold, and the rates for resin sintering and cooling); the impact resistance; and the resistance to environmental stresses over time (such as for example, the environmental stress crack resistance).

Although several polyethylene resins which are suitable for use in molded parts have been developed (see for example U.S. Pat. Appl. Pub. Nos 2016/0229964; 20170267822 and U.S. Pat. Nos. 9,181,422; 9,540,505; 9,695,309; 10,519,304; 10,329,412; 10,053,564; 9,758,653; 9,637,628; 9,475,927; 9,221,966; 9,074,082; 8,962,755 8,022,143), there remains a need for a new polyethylene resins which simultaneously exhibit high flow rates, good stiffness and toughness, as well as environmental resistance properties.

SUMMARY OF INVENTION

We have now developed a bimodal polyethylene composition having good flow properties, relatively high density and stiffness, as well as good environmental stress crack resistance and impact properties. The bimodal polyethylene compositions may be useful in the manufacture of molded articles.

An embodiment of the disclosure is a bimodal polyethylene composition comprising: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL® CO-630 under condition B of greater than 1000 hours.

An embodiment of the disclosure is a molded article prepared from a bimodal polyethylene composition comprising: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL CO-630 under condition B of greater than 1000 hours.

An embodiment of the disclosure is a rotomolded article prepared from a bimodal polyethylene composition comprising: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL CO-630 under condition B of greater than 1000 hours.

An embodiment of the disclosure is a cap or closure prepared from a bimodal polyethylene composition comprising: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL CO-630 under condition B of greater than 1000 hours.

An embodiment of the disclosure is a process for making a rotomolded article from a bimodal polyethylene composition, the process comprising: charging the bimodal polyethylene composition of into a mold; heating the mold in an oven to a temperature of more than 280° C.; rotating the mold around at least 2 axes; cooling the mold while the mold is rotating; opening the mold to release the rotomolded article; wherein the bimodal polyethylene composition comprises: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min;

a long chain branching factor, LCBF of greater than 0.0010; and an environmental stress crack resistance, ESCR as determined by ASTM D1693 in 100% IGEPAL CO-630 under condition B of greater than 1000 hours.

An embodiment of the disclosure is a process for making a cap or closure from a bimodal polyethylene composition, the process comprising: at least one compression molding or injection molding step; wherein the bimodal polyethylene composition comprises: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL CO-630 under condition B of greater than 1000 hours.

An embodiment of the disclosure, is a foamed article prepared from a bimodal polyethylene composition comprising: (i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol; (ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol; wherein the bimodal polyethylene composition has a density of from 0.940 to 0.949 g/cm$^3$; a melt index, $I_2$ of greater than 5.0 g/10 min; a long chain branching factor, LCBF of greater than 0.0010; and an environmental stress crack resistance, ESCR as determined by ASTM D1693 in 100% IGEPAL CO-630 under condition B of greater than 1000 hours.

In an embodiment of the disclosure a bimodal polyethylene composition has a long chain branching factor, LCBF of >0.0050.

In an embodiment of the disclosure a bimodal polyethylene composition contains an additive package comprising: a hindered monophosphite; a diphosphite; a hindered amine light stabilizer; and at least one additional additive selected from the group consisting of a hindered phenol and a hydroxylamine.

DESCRIPTION OF EMBODIMENTS

Figure 1:
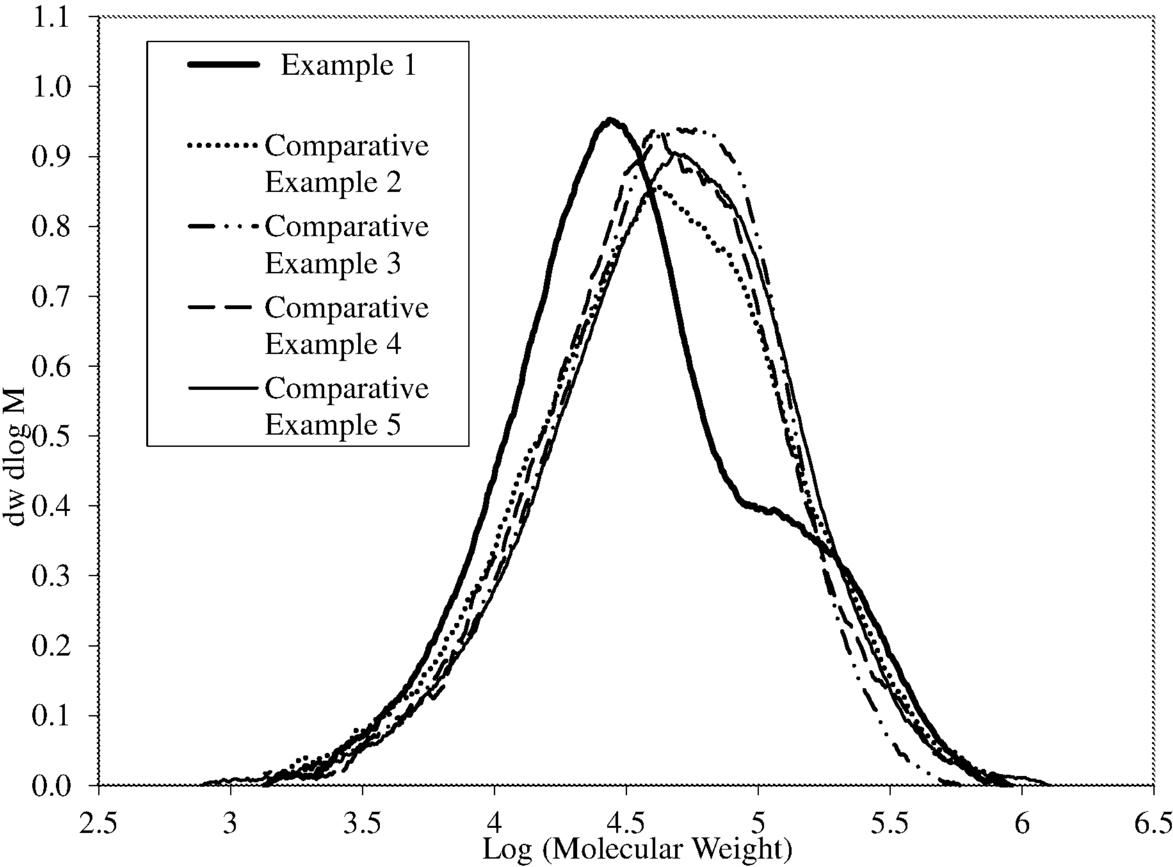
FIG. 1 shows the gel permeation chromatograph with refractive index detection (GPC-RI) obtained for a bimodal polyethylene composition made according to the present disclosure as well as for various comparative resins.

It should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values.

As used herein, the term "monomer" refers to a small molecule that may chemically react and become chemically bonded with itself or other monomers to form a polymer.

As used herein, the term "$\alpha$-olefin" is used to describe a monomer having a linear hydrocarbon chain containing from 3 to 20 carbon atoms having a double bond at one end of the chain; an equivalent term is "linear $\alpha$-olefin".

By the terms "ethylene homopolymer" or "polyethylene homopolymer", it is meant that polymer being referred to is the product of a polymerization process, in which only ethylene was deliberately added or deliberately present as a polymerizable monomer.

By the terms "ethylene copolymer" or "polyethylene copolymer", it is meant that the polymer being referred to is the product of a polymerization process, in which ethylene and one or more than one $\alpha$-olefin were deliberately added or were deliberately present as a polymerizable monomer.

As used herein the term "unsubstituted" means that hydrogen radicals are bonded to the molecular group that follows the term unsubstituted. The term "substituted" means that the group following this term possesses one or more moieties (non-hydrogen radicals) that have replaced one or more hydrogen radicals in any position within the group.

The present disclosure provides a bimodal polyethylene composition comprising two components: (i) a first ethylene copolymer and (ii) a second ethylene copolymer which is different from the first ethylene copolymer.

In an embodiment of the disclosure, the bimodal polyethylene composition is useful in the manufacture of molded articles.

In an embodiment of the disclosure, the bimodal polyethylene composition is useful in the manufacture of a rotomolded article.

In an embodiment of the disclosure, the bimodal polyethylene composition is useful in the manufacture of a cap or closure which is made by compression molding or injection molding.

The First Ethylene Copolymer

In an embodiment of the disclosure the first ethylene copolymer comprises both polymerized ethylene and at least one polymerized α-olefin comonomer, with polymerized ethylene being the majority species.

In embodiments of the disclosure, α-olefins which may be copolymerized with ethylene to make the first ethylene copolymer may be selected from the group comprising 1-propene, 1-butene, 1-pentene, 1-hexene and 1-octene and mixtures thereof.

In an embodiment of the disclosure, the first ethylene copolymer is made with a single site catalyst, non-limiting examples of which include phosphinimine catalysts, metallocene catalysts, and constrained geometry catalysts, all of which are well known in the art.

In an embodiment of the disclosure the first ethylene copolymer is made using a single site polymerization catalyst in a solution phase polymerization process.

In an embodiment of the disclosure, the first ethylene copolymer is made with a single site catalyst, having hafnium, Hf as the active metal center.

In an embodiment of the disclosure, the first ethylene copolymer is an ethylene/1-octene copolymer.

In an embodiment of the disclosure, the first ethylene copolymer is made with a metallocene catalyst.

In an embodiment of the disclosure, the first ethylene copolymer is made with a bridged metallocene catalyst.

In an embodiment of the disclosure, the first ethylene copolymer is made with a bridged metallocene catalyst having the formula I:

(I)

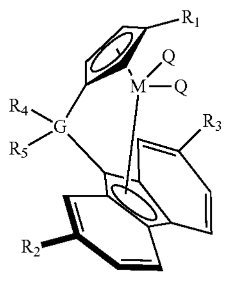

In Formula (I): M is a group 4 metal selected from titanium, zirconium or hafnium; G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

In an embodiment, G is carbon.

In an embodiment, $R_4$ and $R_5$ are independently an aryl group.

In an embodiment, $R_4$ and $R_5$ are independently a phenyl group or a substituted phenyl group.

In an embodiment, $R_4$ and $R_5$ are a phenyl group.

In an embodiment, $R_4$ and $R_5$ are independently a substituted phenyl group.

In an embodiment, $R_4$ and $R_5$ are a substituted phenyl group, wherein the phenyl group is substituted with a substituted silyl group.

In an embodiment, $R_4$ and $R_5$ are a substituted phenyl group, wherein the phenyl group is substituted with a trialkyl silyl group.

In an embodiment, $R_4$ and $R_5$ are a substituted phenyl group, wherein the phenyl group is substituted at the para position with a trialkylsilyl group. In an embodiment, $R_4$ and $R_5$ are a substituted phenyl group, wherein the phenyl group is substituted at the para position with a trimethylsilyl group. In an embodiment, $R_4$ and $R_5$ are a substituted phenyl group, wherein the phenyl group is substituted at the para position with a triethylsilyl group.

In an embodiment, $R_4$ and $R_5$ are independently an alkyl group.

In an embodiment, $R_4$ and $R_5$ are independently an alkenyl group.

In an embodiment, $R_1$ is hydrogen.

In an embodiment, $R_1$ is an alkyl group.

In an embodiment, $R_1$ is an aryl group.

In an embodiment, $R_1$ is an alkenyl group.

In an embodiment, $R_2$ and $R_3$ are independently a hydrocarbyl group having from 1 to 30 carbon atoms.

In an embodiment, $R_2$ and $R_3$ are independently an aryl group.

In an embodiment, $R_2$ and $R_3$ are independently an alkyl group.

In an embodiment, $R_2$ and $R_3$ are independently an alkyl group having from 1 to 20 carbon atoms.

In an embodiment, $R_2$ and $R_3$ are independently a phenyl group or a substituted phenyl group.

In an embodiment, $R_2$ and $R_3$ are a tert-butyl group.

In an embodiment, $R_2$ and $R_3$ are hydrogen.

In an embodiment M is hafnium, Hf.

In an embodiment of the disclosure, the first ethylene copolymer is made with a bridged metallocene catalyst having the formula I:

(I)

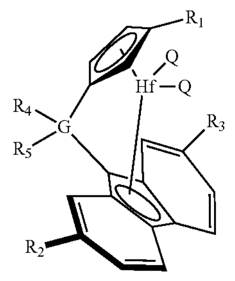

In Formula (I): G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently selected from the group consisting of a halide atom, a $C_{1-4}$ alkyl radical and a benzyl radical. Particularly suitable activatable ligands Q are monoanionic such as a halide (e.g. chloride) or a hydrocarbyl (e.g. methyl, benzyl).

In an embodiment of the disclosure, the single site catalyst used to make the first ethylene copolymer is diphenylmethylene(cyclopentadienyl)(2,7-di-t-butylfluorenyl)hafnium dichloride having the molecular formula: $[(2,7\text{-}tBu_2Flu)Ph_2C(Cp)HfCl_2]$.

In an embodiment of the disclosure the single site catalyst used to make the first ethylene copolymer is diphenylmethylene(cyclopentadienyl)(2,7-di-t-butylfluorenyl)hafnium dimethyl having the molecular formula: $[(2,7\text{-}tBu_2Flu)Ph_2C(Cp)HfMe_2]$.

In addition to the single site catalyst molecule per se, an active single site catalyst system may further comprise one or more of the following: an alkylaluminoxane co-catalyst and an ionic activator. The single site catalyst system may also optionally comprise a hindered phenol.

Although the exact structure of alkylaluminoxane is uncertain, subject matter experts generally agree that it is an oligomeric species that contain repeating units of the general formula:

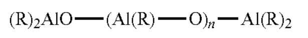

where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below:

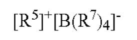

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula $—Si(R^9)_3$, where each $R^9$ is independently selected from hydrogen atoms and $C_{1-4}$ alkyl radicals, and

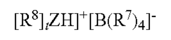

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above.

In both formula a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropylium tetrakispentafluorophenyl borate, triphenylmethylium tetrakispentafluorophenyl borate, benzene(diazonium)tetrakispentafluorophenyl borate, tropylium tetrakis(2,3,5,6-tetrafluorophenyl)borate, triphenylmethylium tetrakis(2,3,5,6-tetrafluorophenyl)borate, benzene(diazonium)tetrakis(3,4,5-trifluorophenyl)borate, tropylium tetrakis(3,4,5-trifluorophenyl)borate, benzene(diazonium) tetrakis(3,4,5-trifluorophenyl)borate, tropylium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropylium tetrakis(2,3,4,5- tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting example of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active metallocene based catalyst system the quantity and mole ratios of the three or four components: the metallocene single site catalyst, the alkylaluminoxane, the ionic activator, and the optional hindered phenol are optimized.

In an embodiment of the disclosure, the single site catalyst used to make the first ethylene copolymer produces long chain branches, and the first ethylene copolymer will contain long chain branches, hereinafter 'LCB'.

LCB is a well-known structural phenomenon in ethylene copolymers and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In embodiments of this disclosure, a long chain branch is macromolecular in nature, i.e. long enough to be seen in an NMR spectra, triple detector SEC experiments or rheological experiments.

In an embodiment of the disclosure, the first ethylene copolymer contains long chain branching characterized by the long chain branching factor, LCBF disclosed herein. In embodiments of the disclosure, the upper limit on the LCBF of the first ethylene copolymer may be 0.5000, or 0.4000, or 0.3000 (dimensionless). In embodiments of the disclosure, the lower limit on the LCBF of the first ethylene copolymer may be 0.0010, or 0.0015, or 0.0020, or 0.0050, or 0.0070, or 0.0100, or 0.0500, or 0.1000 (dimensionless).

In embodiments of the disclosure, the LCBF of the first ethylene copolymer is at least 0.0010, or at least 0.0020, or at least 0.0050, or at least 0.0070, or at least 0.0100.

The first ethylene copolymer may contain catalyst residues that reflect the chemical composition of the catalyst formulation used to make it. Those skilled in the art will understand that catalyst residues are typically quantified by the parts per million of metal, in for example the first ethylene copolymer (or the bimodal polyethylene composition; see below), where the metal present originates from the metal in the catalyst formulation used to make it. Non-limiting examples of the metal residue which may be present include Group 4 metals, titanium, zirconium and hafnium. In embodiments of the disclosure, the upper limit on the ppm of metal in the first ethylene copolymer may be about 3.0 ppm, in other cases about 2.0 ppm and in still other cases about 1.5 ppm. In embodiments of the disclosure, the lower limit on the ppm of metal in the first ethylene copolymer may be about 0.03 ppm, in other cases about 0.09 ppm and in still other cases about 0.15 ppm.

In an embodiment of the disclosure, the first ethylene copolymer has from 1 to 100 short chain branches per thousand carbon atoms (SCB1). In further embodiments, the first ethylene copolymer has from 3 to 100 short chain branches per thousand carbon atoms (SCB1), or from 5 to 100 short chain branches per thousand carbon atoms (SCB1), or from 5 to 75 short chain branches per thousand carbon atoms (SCB1), or from 10 to 75 short chain branches per thousand carbon atoms (SCB1), or from 5 to 50 short chain branches per thousand carbon atoms (SCB1), or from 5 to 30 short chain branches per thousand carbon atoms, or from 10 to 50 short chain branches per thousand carbon atoms (SCB1), or from 15 to 75 short chain branches per thousand carbon atoms (SCB1), or from 3 to 50 short chain branches per thousand carbon atoms (SCB1), or from 7.5 to 50 short chain branches per thousand carbon atoms (SCB1), or from or from 5 to 40 short chain branches per thousand carbon atoms (SCB1), or from 5 to 30 short chain branches per thousand carbon atoms (SCB1), or from or from 5 to 25 short chain branches per thousand carbon atoms (SCB1).

The short chain branching (i.e. the short chain branching per thousand backbone carbon atoms, SCB1) is the branching due to the presence of an α-olefin comonomer in the ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the first ethylene copolymer (SCB1), is greater than the number of short chain branches per thousand carbon atoms in the second ethylene copolymer (SCB2).

In an embodiment of the disclosure, the density of the first copolymer is less than the density of the second ethylene copolymer.

In an embodiment of the disclosure, the first ethylene copolymer has a density of from 0.865 to 0.928 g/cm$^3$, including any narrower ranges within this range and any values encompassed by these ranges. For example, in embodiments of the disclosure, the first ethylene copolymer has a density of from 0.865 to 0.926 g/cm$^3$, or from 0.865 to 0.925 g/cm$^3$, or from 0.875 to 0.922 g/cm$^3$, or from 0.880 to 0.928 g/cm$^3$, or from 0.880 to 0.926 g/cm$^3$, or from 0.880 to 0.925 g/cm$^3$, or from 0.880 to 0.922 g/cm$^3$, or from 0.880 to 0.920 g/cm$^3$, or from 0.880 to 0.919 g/cm$^3$, or from 0.880 to 0.918 g/cm$^3$, or from 0.880 to 0.916 g/cm$^3$, or from 0.880 to 0.912 g/cm$^3$, or from 0.880 to 0.910 g/cm$^3$, or from 0.880 to 0.909 g/cm$^3$, or from 0.880 to 0.908 g/cm, or from 0.890 to 0.920 g/cm$^3$, or from 0.890 to 0.919 g/cm$^3$, or from 0.890 to 0.918 g/cm$^3$, or from 0.890 to 0.916 g/cm$^3$, or from 0.890 to 0.912 g/cm$^3$, or from 0.890 to 0.910 g/cm$^3$, or from 0.890 to 0.909 g/cm$^3$, or from 0.890 to 0.908 g/cm, or from 0.900 to 0.920 g/cm$^3$, or from 0.900 to 0.919 g/cm$^3$, or from 0.900 to 0.918 g/cm$^3$, or from 0.900 to 0.916 g/cm$^3$, or from 0.900 to 0.912 g/cm$^3$, or from 0.900 to 0.910 g/cm$^3$, or from 0.900 to 0.909 g/cm$^3$, or from 0.900 to 0.908 g/cm In an embodiment of the disclosure, the first ethylene copolymer has a density of from 0.880 to less than 0.920 g/cm$^3$.

In embodiments of the disclosure, the first ethylene copolymer has a density of from 0.880 to less than 0.918 g/cm$^3$, or from 0.880 to less than 0.910 g/cm$^3$.

In an embodiment of the disclosure, the first ethylene copolymer has a density of less than 0.918 g/cm$^3$, or less than 0.910 g/cm$^3$.

In an embodiment of the disclosure, the melt index, $I_2$ of the first ethylene copolymer is less than the melt index, $I_2$ of second ethylene copolymer.

In embodiments of the disclosure the first ethylene copolymer has a melt index, 12 of, ≤10 g/10 min, or ≤5.0 g/10 min, or ≤2.5 g/10 min, or ≤1.0 g/10 min, or <1.0 g/10 min. In another embodiment of the disclosure, the first ethylene copolymer has a melt index, $I_2$ of from 0.001 to 10.0 g/10 min, including any narrower ranges within this range and any values encompassed by these ranges. For example, in embodiments of the disclosure, the melt index, $I_2$ of the first ethylene copolymer may be from 0.001 to 7.5 g/10 min, or from 0.001 to 5.0 g/10 min, or from 0.001 to 2.5 g/10 min, or 0.001 to 1.0 g/10 min, or from 0.01 to 10.0 g/10 min, or from 0.01 to 7.5 g/10 min, or from 0.01 to 5.0 g/10 min, or from 0.01 to 2.5 g/10 min, or from 0.01 to 1.0 g/10 min, or from 0.1 to 10.0 g/10 min, or from 0.1 to 7.5 g/10 min, or from 0.1 to 5.0 g/10 min, or from 0.1 to 2.5 g/10 min, or from 0.1 to 1.0 g/10 min, or from 0.1 to less than 1.0 g/10 min.

In an embodiment of the disclosure, the first ethylene copolymer has a weight average molecular weight, $M_w$ of from 75,000 to 300,000 g/mol, including any narrower ranges within this range and any values encompassed by these ranges. For example, in embodiments of the disclosure, the first ethylene copolymer has a weight average molecular weight, $M_w$ of from 100,000 to 250,000 g/mol, or from 100,000 to 225,000 g/mol, or from 100,000 to 200,000 g/mol, or from 125,000 to 200,000 g/mol, or from 125,000 to 180,000 g/mol In an embodiment of the disclosure, the first ethylene copolymer has a melt flow ratio, $I_{21}/I_2$ of less than 25, or less than 23, or less than 20.

In embodiments of the disclosure, the upper limit on the molecular weight distribution, $M_w/M_n$ of the first ethylene copolymer may be about 2.7, or about 2.5, or about 2.4, or about 2.3, or about 2.2. In embodiments of the disclosure, the lower limit on the molecular weight distribution, $M_w/M_n$ of the first ethylene copolymer may be about 1.6, or about 1.7, or about 1.8, or about 1.9.

In embodiments of the disclosure, the first ethylene copolymer has a molecular weight distribution, $M_w/M_n$ of ≤3.0, or <3.0, or ≤2.7, or <2.7, or ≤2.5, or <2.5, or ≤2.3, or <2.3, or ≤2.1, or <2.1, or about 2. In another embodiment of the disclosure, the first ethylene copolymer has a molecular weight distribution, $M_w/M_n$ of from 1.7 to 3.0, including any narrower ranges within this range and any values encompassed by these ranges. For example, in embodiments of the disclosure, the first ethylene copolymer has a molecular weight distribution, $M_w/M_n$ of from 1.7 to 2.7, or from 1.8 to 2.7, or from 1.8 to 2.5, or from 1.8 to 2.3, or from 1.9 to 2.1.

In embodiments of the disclosure, the upper limit on the $CDBI_{50}$ of the first ethylene copolymer may be about 98 weight %, in other cases about 95 weight % and in still other cases about 90 weight %. In embodiments of the disclosure, the lower limit on the $CDBI_{50}$ of the first ethylene copolymer may be about 70 weight %, in other cases about 75 weight % and in still other cases about 80 weight %.

In an embodiment of the disclosure, a single site catalyst which gives an ethylene copolymer having a $CDBI_{50}$ of at least 65% by weight, or at least 70%, or at least 75%, or at least 80%, or at least 85%, during solution phase polymerization in a single reactor, is used in the preparation of the first ethylene copolymer.

In embodiments of the present disclosure, the first ethylene copolymer is ethylene copolymer which has a $CDBI_{50}$ of greater than about 60% by weight, or greater than about 65%, or greater than about 70%, or greater than about 75%, or greater than about 80%, or greater than about 85%.

In embodiments of the disclosure, the weight percent (wt %) of the first ethylene copolymer in the bimodal polyethylene composition (i.e. the weight percent of the first ethylene copolymer based on the total weight of the first ethylene copolymer and the second ethylene copolymers) may be from about 5 wt % to about 75 wt %, including any narrower ranges within this range and any values encompassed by these ranges. For example, in embodiments of the disclosure, the weight percent (wt %) of the first ethylene copolymer in the polyethylene copolymer composition may be from about 5 wt % to about 65 wt %, or from about 10 wt % to about 60 wt %, or from about 10 wt % to about 50 wt %, or from about 10 wt % to about 45 wt %, or from about 10 wt % to about 40 wt % or from about 15 wt % to about 50 wt %, or from about 15 wt % to about 40 wt %, or from about 20 to 40 wt %, or from about 20 to 35 wt %.

The Second Ethylene Copolymer

In an embodiment of the disclosure the second ethylene copolymer comprises both polymerized ethylene and at least one polymerized α-olefin comonomer, with polymerized ethylene being the majority species.

In embodiments of the disclosure, α-olefins which may be copolymerized with ethylene to make the second ethylene copolymer may be selected from the group comprising 1-propene, 1-butene, 1-pentene, 1-hexene and 1-octene and mixtures thereof.

In an embodiment of the disclosure, the second ethylene copolymer is made with a single site catalyst, non-limiting examples of which include phosphinimine catalysts, metallocene catalysts, and constrained geometry catalysts, all of which are well known in the art.

In an embodiment of the disclosure the second ethylene copolymer is made using a single site polymerization catalyst in a solution phase polymerization process.

In an embodiment of the disclosure, the second ethylene copolymer is made with a single site catalyst, having hafnium, Ti as the active metal center.

In an embodiment of the disclosure, the second ethylene copolymer is an ethylene/1-octene copolymer.

In an embodiment of the disclosure, the second ethylene copolymer is made with a phosphinimine catalyst.

In an embodiment of the disclosure, the second ethylene copolymer is made with a phosphinimine catalyst having the formula II:

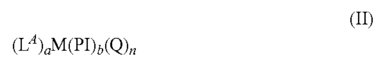

$$(L^A)_aM(PI)_b(Q)_n \quad (II)$$

wherein ($L^A$) represents is cyclopentadienyl-type ligand; M represents a metal atom selected from the group consisting of Ti, Zr, and Hf; PI represents a phosphinimine ligand; Q represents an activatable ligand as already defined above; a is 0 or 1; b is 1 or 2; (a+b)=2; n is 1 or 2; and the sum of (a+b+n) equals the valance of the metal M.

As used herein, the term "cyclopentadienyl-type" ligand is meant to include ligands which contain at least one five-carbon ring which is bonded to the metal via eta-5 (or in some cases eta-3) bonding. Thus, the term "cyclopentadienyl-type" includes, for example, unsubstituted cyclopentadienyl, singly or multiply substituted cyclopentadienyl, unsubstituted indenyl, singly or multiply substituted indenyl, unsubstituted fluorenyl and singly or multiply substituted fluorenyl. Hydrogenated versions of indenyl and fluorenyl ligands are also contemplated for use in the current disclosure, so long as the five-carbon ring which bonds to the metal via eta-5 (or in some cases eta-3) bonding remains intact. Substituents for a cyclopentadienyl ligand, an indenyl ligand (or hydrogenated version thereof) and a fluorenyl ligand (or hydrogenated version thereof) may be selected from the group consisting of a $C_{1-30}$ hydrocarbyl radical (which hydrocarbyl radical may be unsubstituted or further substituted by for example a halide and/or a hydrocarbyl group; for example a suitable substituted $C_{1-30}$ hydrocarbyl radical is a pentafluorobenzyl group such as —$CH_2C_6F_5$); a halogen atom; a $C_{1-8}$ alkoxy radical; a $C_{6-10}$ aryl or aryloxy radical (each of which may be further substituted by for example a halide and/or a hydrocarbyl group); an amido radical which is unsubstituted or substituted by up to two $C_{1-8}$ alkyl radicals; a phosphido radical which is unsubstituted or substituted by up to two $C_{1-8}$ alkyl radicals; a silyl radical of the formula —$Si(R')_3$ wherein each R' is independently selected from the group consisting of hydrogen, a $C_{1-8}$ alkyl or alkoxy radical, $C_{6-10}$ aryl or aryloxy radicals; and a germanyl radical of the formula —$Ge(R')_3$ wherein R' is as defined directly above.

The phosphinimine ligand, PI, is defined by formula:

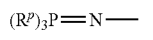

wherein the $R^p$ groups are independently selected from: a hydrogen atom; a halogen atom; $C_{1-20}$ hydrocarbyl radicals which are unsubstituted or substituted with one or more halogen atom(s); a $C_{1-8}$ alkoxy radical; a $C_{6-10}$ aryl radical; a $C_{6-10}$ aryloxy radical; an amido radical; a silyl radical of formula —$Si(R^s)_3$, wherein the $R^s$ groups are independently selected from, a hydrogen atom, a $C_{1-8}$ alkyl or alkoxy radical, a $C_{6-10}$ aryl radical, a $C_{6-10}$ aryloxy radical, or a germanyl radical of formula —$Ge(R^G)_3$, wherein the $R^G$ groups are defined as $R^s$ is defined in this paragraph.

In an embodiment of the disclosure, the metal, M in the phosphinimine catalyst is titanium, Ti.

In an embodiment of the disclosure, the single site catalyst used to make the second ethylene copolymer is cyclopentadienyl tri(tertiarybutyl)phosphinimine titanium dichloride, $Cp((t\text{-}Bu)_3PN)TiCl_2$.

As already discussed above, in addition to the single site catalyst molecule per se, an active single site catalyst system may further comprise one or more of the following: an alkylaluminoxane co-catalyst and an ionic activator, both of which have already been defined above. The single site catalyst system may also optionally comprise a hindered phenol, as already defined.

To produce an active phosphinimine based catalyst system the quantity and mole ratios of the three or four components: the phosphinimine single site catalyst, the alkylaluminoxane, the ionic activator, and the optional hindered phenol may be optimized.

In an embodiment of the disclosure, the single site catalyst used to make the second ethylene copolymer produces no long chain branches, and/or the second copolymer will contain no measurable amounts of long chain branches.

The second ethylene copolymer may contain catalyst residues that reflect the chemical composition of the catalyst formulation used to make it. Those skilled in the art will understand that catalyst residues are typically quantified by the parts per million of metal, in for example the second ethylene copolymer (or the bimodal polyethylene composition; see below), where the metal present originates from the metal in the catalyst formulation used to make it. Non-limiting examples of the metal residue which may be present include Group 4 metals, titanium, zirconium and hafnium. In embodiments of the disclosure, the upper limit on the ppm of metal in the second ethylene copolymer may be about 3.0 ppm, in other cases about 2.0 ppm and in still other cases about 1.5 ppm. In embodiments of the disclosure, the lower limit on the ppm of metal in the second ethylene copolymer may be about 0.03 ppm, in other cases about 0.09 ppm and in still other cases about 0.15 ppm.

In an embodiment of the disclosure, the short chain branching in the second ethylene copolymer can be from about 0.10 to about 10.0 short chain branches per thousand carbon atoms (SCB2/1000Cs). In further embodiments of the disclosure, the short chain branching in the second ethylene copolymer can be from 0.10 to 7.5, or from 0.10 to 5.0, or from 0.10 to 3.0, or from 0.10 to 1.5 branches per thousand carbon atoms (SCB2/1000Cs).

The short chain branching (i.e. the short chain branching per thousand backbone carbon atoms, SCB2) is the branching due to the presence of an α-olefin comonomer in the ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the second ethylene copolymer (SCB2), is fewer than the number of short chain branches per thousand carbon atoms in the first ethylene copolymer (SCB1).

In an embodiment of the disclosure, the density of the second copolymer is greater than the density of the first ethylene copolymer.

In an embodiment of the disclosure, the second ethylene copolymer has a density of from 0.945 to 0.975 g/cm$^3$, including any narrower ranges within this range and any values encompassed by these ranges. For example, in embodiments of the disclosure, the second ethylene copolymer has a density of from 0.945 to 0.970 g/cm$^3$, or from 0.945 to 0.965 g/cm$^3$, or from 0.945 to 0.963 g/cm$^3$, or from 0.945 to 0.962 g/cm$^3$, or from 0.950 to 0.970 g/cm$^3$, or from 0.950 to 0.965 g/cm$^3$, or from 0.950 to 0.963 g/cm$^3$, or from 0.950 to 0.962 g/cm$^3$, or from 0.952 to 0.970 g/cm$^3$, or from 0.952 to 0.965 g/cm$^3$, or from 0.952 to 0.963 g/cm$^3$, or from 0.952 to 0.962 g/cm$^3$, or from 0.955 to 0.975 g/cm$^3$, or from 0.955 to 0.972 g/cm$^3$, or from 0.955 to 0.970 g/cm$^3$, or from 0.955 to 0.965 g/cm$^3$, or from 0.955 to 0.963 g/cm$^3$, or from 0.955 to 0.962 g/cm$^3$.

In an embodiment of the disclosure, the melt index, $I_2$ of the second ethylene copolymer is greater than the melt index, $I_2$ of first ethylene copolymer.

In an embodiment of the disclosure the second ethylene copolymer has a melt index, $I_2$ of ≥20.0 g/10 min.

In an embodiment of the disclosure the second ethylene copolymer has a melt index, $I_2$ of ≥50.0 g/10 min.

In embodiments of the disclosure the second ethylene copolymer has a melt index, $I_2$ of from 10 to 5,000 including any narrower ranges within this range and any values encompassed by these ranges. For example, in embodiments of the disclosure, the melt index, $I_2$ of the second ethylene copolymer is from 10 to 2,500 g/10 min, or from 15 to 2,500 g/10 min, or from 20 to 5,000 g/10 min, or from 20 to 2,500 g/10 min, or from 50 to 5,000 g/10 min, or from 50 to 2,500 g/10 min, or from 20 to 1,000 g/10 min, or from 50 to 1,000 g/10 min, or from 20 to 500 g/10 min, or from 50 to 500 g/10 min, or from 20 to 250 g/10 min, or from 50 to 250 g/10 min.

In an embodiment of the disclosure, the second ethylene copolymer has a weight average molecular weight, $M_w$ of ≤75,000 g/mol, or ≤60,000 g/mol, or ≤50,000 g/mol, or ≤45,000 g/mol, or K 40,000 g/mol, or ≤35,000 g/mol, or ≤30,000 g/mol. In another embodiment the second ethylene copolymer has a weight average molecular weight, $M_w$ of from 5,000 to 75,000 g/mol, including any narrower ranges within this range and any values encompassed by these ranges. For example, in embodiments of the disclosure, the second ethylene copolymer has a weight average molecular weight, $M_w$ of from 10,000 to 75,000 g/mol, or from 15,000 to 75,000 g/mol, or from 15,000 to 65,000 g/mol, or from 15,000 to 60,000 g/mol, or from 15,000 to 50,000 g/mol, or from 20,000 to 60,000 g/mol, or from 20,000 to 55,000 g/mol, or from 20,000 to 50,000 g/mol, or from 20,00 to 40,000 g/mol.

In an embodiment of the disclosure, the second ethylene copolymer has a melt flow ratio, $I_{21}/I_2$ of less than 25, or less than 23, or less than 20.

In embodiments of the disclosure, the upper limit on the molecular weight distribution, $M_w/M_n$ of the second ethylene copolymer may be about 2.7, or about 2.5, or about 2.4, or about 2.3, or about 2.2. In embodiments of the disclosure, the lower limit on the molecular weight distribution, $M_w/M_n$ of the second ethylene copolymer may be about 1.6, or about 1.7, or about 1.8, or about 1.9.

In embodiments of the disclosure, the second ethylene copolymer has a molecular weight distribution, $M_w/M_n$ of ≤3.0, or <3.0, or ≤2.7, or <2.7, or ≤2.5, or <2.5, or ≤2.3, or <2.3, or ≤2.1, or <2.1, or about 2. In another embodiment of the disclosure, the second ethylene copolymer has a molecular weight distribution, $M_w/M_n$ of from 1.7 to 3.0, including any narrower ranges within this range and any values encompassed by these ranges. For example, in embodiments of the disclosure, the second ethylene copolymer has a molecular weight distribution, $M_w/M_n$ of from 1.8 to 2.7, or from 1.8 to 2.5, or from 1.8 to 2.3, or from 1.7 to 2.3, or from 1.9 to 2.1.

In embodiments of the disclosure, the upper limit on the $CDBI_{50}$ of the second ethylene copolymer may be about 98 weight %, in other cases about 95 weight % and in still other cases about 90 weight %. In embodiments of the disclosure, the lower limit on the $CDBI_{50}$ of the second ethylene copolymer may be about 70 weight %, in other cases about 75 weight % and in still other cases about 80 weight %.

In an embodiment of the disclosure, a single site catalyst which gives an ethylene copolymer having a $CDBI_{50}$ of at least 65% by weight, or at least 70%, or at least 75%, or at least 80%, or at least 85%, during solution phase polymerization in a single reactor, is used in the preparation of the second ethylene copolymer.

In an embodiment of the present disclosure, the second ethylene copolymer is ethylene copolymer which has a $CDBI_{50}$ of greater than about 60% by weight, or greater than about 65%, or greater than about 70%, or greater than about 75%, or greater than about 80%, or greater than about 85%.

In embodiments of the disclosure, the weight percent (wt %) of the second ethylene copolymer in the bimodal polyethylene composition (i.e. the weight percent of the second ethylene copolymer based on the total weight of the first ethylene copolymer and the second ethylene copolymers) may be from about 95 wt % to about 25 wt %, including any narrower ranges within this range and any values encompassed by these ranges. For example, in embodiments of the disclosure, the weight percent (wt %) of the second ethylene copolymer in the polyethylene copolymer composition may be from about 95 wt % to about 35 wt %, or from about 90 wt % to about 40 wt %, or from about 90 wt % to about 50 wt %, or from about 90 wt % to about 55 wt %, or from about 90 wt % to about 60 wt % or from about 85 wt % to about 50 wt %, or from about 85 wt % to about 60 wt %, or from about 80 to 60 wt %, or from about 80 to 65 wt %.

The Bimodal Polyethylene Composition

In an embodiment of the disclosure, the bimodal polyethylene composition will comprise a first ethylene copolymer and a second ethylene copolymer (each as defined above).

The polyethylene compositions disclosed herein can be made using any well-known techniques in the art, including but not limited to melt blending, solution blending, or in-reactor blending to bring together a first ethylene copolymer and a second ethylene copolymer.

In an embodiment, the bimodal polyethylene composition of the present disclosure is made using a single site catalyst in a first reactor to give a first ethylene copolymer, and a single site catalyst in a second reactor to give a second ethylene copolymer.

In an embodiment, the bimodal polyethylene composition of the present disclosure is made by forming a first ethylene copolymer in a first reactor by polymerizing ethylene and an α-olefin with a single site catalyst; and forming a second ethylene copolymer in a second reactor by polymerizing ethylene and an α-olefin with a single site catalyst.

In an embodiment, the bimodal polyethylene composition of the present disclosure is made by forming a first ethylene copolymer in a first solution phase polymerization reactor by polymerizing ethylene and an α-olefin with a single site catalyst; and forming a second ethylene copolymer in a second solution phase polymerization reactor by polymerizing ethylene and an α-olefin with a single site catalyst.

In an embodiment, the bimodal polyethylene composition of the present disclosure is made by forming a first ethylene copolymer in a first solution phase polymerization reactor by polymerizing ethylene and α-olefin with a single site catalyst; and forming a second ethylene copolymer in a second solution phase polymerization reactor by polymerizing ethylene and an α-olefin with a single site catalyst, where the first and second solution phase polymerization reactors are configured in series with one another.

In an embodiment, the bimodal polyethylene composition of the present disclosure is made by forming a first ethylene copolymer in a first solution phase polymerization reactor by polymerizing ethylene and α-olefin with a single site catalyst; and forming a second ethylene copolymer in a second solution phase polymerization reactor by polymerizing ethylene and an α-olefin with a single site catalyst, where the first and second solution phase polymerization reactors are configured in parallel to one another.

In embodiments, the solution phase polymerization reactor used as a first solution phase reactor is a continuously stirred tank reactor or a tubular reactor.

In an embodiment, the solution phase polymerization reactor used as a second solution phase reactor is a continuously stirred tank reactor or a tubular reactor.

In solution polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components may be premixed in the solvent for the reaction or fed as separate streams to the reactor. In some instances, catalyst components premixing may be desirable to provide a reaction time for the catalyst components prior to entering the polymerization reaction zone. Such an "in line mixing" technique is well known to persons skilled in the art.

Solution polymerization processes for the polymerization or copolymerization of ethylene are well known in the art (see for example, U.S. Pat. Nos. 6,372,864 and 6,777,509). These processes are conducted in the presence of an inert hydrocarbon solvent. In a solution phase polymerization reactor, a variety of solvents may be used as the process solvent; non-limiting examples include linear, branched or cyclic $C_5$ to $C_{12}$ alkanes. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

The polymerization temperature in a conventional solution process may be from about 80° C. to about 300° C. In an embodiment of the disclosure the polymerization temperature in a solution process is from about 120° C. to about 250° C. The polymerization pressure in a solution process may be a "medium pressure process", meaning that the pressure in the reactor is less than about 6,000 psi (about 42,000 kiloPascals or kPa). In an embodiment of the disclosure, the polymerization pressure in a solution process may be from about 10,000 to about 40,000 kPa, or from about 14,000 to about 22,000 kPa (i.e. from about 2,000 psi to about 3,000 psi).

Suitable comonomers (i.e. α-olefins) for copolymerization with ethylene in a solution phase polymerization process include $C_{3-20}$ mono- and di-olefins. In embodiments of the disclosure, comonomers which may be copolymerized with ethylene include $C_{3-12}$ α-olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. In further embodiments of the disclosure, α-olefins which may be copolymerized with ethylene are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment of the disclosure, the bimodal polyethylene composition comprises ethylene and one or more than one alpha olefin selected from the group comprising 1-butene, 1-hexene, 1-octene and mixtures thereof.

In an embodiment of the disclosure, the bimodal polyethylene composition comprises ethylene and one or more than one alpha olefin selected from the group comprising 1-hexene, 1-octene and mixtures thereof.

In an embodiment of the disclosure, the bimodal polyethylene composition comprises ethylene and 1-octene.

In an embodiment of the disclosure, the bimodal polyethylene composition has from 0.1 to 7.5 mole percent of one or more than one α-olefin, including any narrower ranges within this range and any values encompassed by these ranges. For example, in embodiments of the disclosure, the bimodal polyethylene composition has from 0.1 to 5.0 mole percent of one or more than one α-olefin, or from 0.1 to 3.0 mole percent of one or more than one α-olefin, or from 0.5 to 5.0 mole percent of one or more than one α-olefin, or from 0.5 to 3 mole percent of one or more than one α-olefin, or from 0.1 to 2.5 mole percent of one or more than one α-olefin, or from 0.1 to 2.0 mole percent of one or more than one α-olefin, or from 0.5 to 2.0 mole percent of one or more than one α-olefin.

In embodiments of the disclosure, the bimodal polyethylene composition has from 0.1 to 5.0 mole percent of 1-octene, or from 0.1 to 3.0 mole percent of 1-octene, or from 0.5 to 5.0 mole percent of 1-octene, or from 0.5 to 3 mole percent of 1-octene, or from 0.1 to 2.5 mole percent of 1-octene, or from 0.1 to 2.0 mole percent of 1-octene, or from 0.5 to 2.0 mole percent of 1-octene.

In an embodiment of the disclosure, the bimodal polyethylene composition that comprises a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of at least 5.0 (i.e., SCB1/SCB2≥5.0). In further embodiments of the disclosure, the ratio of the short chain branching in the first ethylene copolymer (SCB1) to the short chain branching in the second ethylene copolymer (SCB2) is at least 7.5 or greater than 7.5. In still further embodiments of the disclosure, the ratio of the short chain branching in the first ethylene copolymer (SCB1) to the short chain branching in the second ethylene copolymer (SCB2) is at least 10.0 or greater than 10.0.

In an embodiment of the disclosure, the bimodal polyethylene composition has a weight average molecular weight, $M_w$ of ≤100,000 g/mol, or ≤80,000 g/mol, or ≤75,000 g/mol, or ≤70,000 g/mol, or <100,000 g/mol, or <80,000 g/mol, or <75,000 g/mol, or <70,000 g/mol.

In embodiments of the disclosure, the bimodal polyethylene composition has a weight average molecular weight, $M_w$ of from 30,000 to 150,000 g/mol, including any narrower ranges within this range and any values encompassed by these ranges. For example, in embodiments of the disclosure, the bimodal polyethylene composition has a weight average molecular weight, $M_w$ of from 30,000 to 125,000 g/mol, or from 35,000 to 100,000 g/mol, or from 40,000 to 80,000 g/mol, or from 50,000 to 75,000 g/mol.

In an embodiment of the disclosure, the bimodal polyethylene composition has a number average molecular weight, $M_n$ of ≤60,000 g/mol, or ≤50,000 g/mol, or <50,000 g/mol, or ≤45,000 g/mol, or <45,000 g/mol, or ≤40,000 g/mol, or <40,000 g/mol, or ≤35,000 g/mol, or <35,000 g/mol, or ≤30,000 g/mol, or <30,000 g/mol, or ≤25,000 g/mol, or <25,000 g/mol. In further embodiments of the disclosure, the bimodal polyethylene composition has a number average molecular weight, $M_n$ of from 5,000 to 60,000 g/mol, including any narrower ranges within this range and any values encompassed by these ranges. For example, in embodiments of the disclosure, the bimodal polyethylene composition has a number average molecular weight, $M_n$ of from 10,000 to 55,000 g/mol, or from 10,000 to 50,000 g/mol, or from 15,000 to 50,000 g/mol, or from 15,000 to 45,000 g/mol, or from 15,000 to 40,000 g/mol, or from 15,000 to 35,000 g/mol, or from 15,000 to 30,000 g/mol, or from 15,000 to 25,000 g/mol.

In an embodiment of the disclosure, the bimodal polyethylene composition has a Z-average molecular weight, $M_z$, of K 250,000 g/mol, or K 225,000 g/mol, or K 200,000 g/mol, or <250,000 g/mol, or <225,000 g/mol, or <200,000 g/mol.

In further embodiments of the disclosure, the bimodal polyethylene composition has a Z-average molecular weight, $M_z$ of from 125,000 to 300,000 g/mol, including any narrower ranges within this range and any values encompassed by these ranges. For example, in embodiments of the disclosure, the bimodal polyethylene composition has a Z-average molecular weight, $M_z$ of from 125,000 to 275,000 g/mol, or from 125,000 to 250,000 g/mol, or from 125,000 to 225,000 g/mol, or from 125,000 g/mol to 200,000 g/mol, or from 125,000 to 190,000 g/mol, or from 150,000 g/mol to 200,000 g/mol, or from 175,000 g/mol to 200,000 g/mol.

In an embodiment of the disclosure, the bimodal polyethylene copolymer composition has a bimodal profile (i.e. a bimodal molecular weight distribution) in a gel permeation chromatography (GPC) analysis.

In an embodiment of the disclosure, the bimodal polyethylene copolymer composition has a bimodal profile in a gel permeation chromatograph generated according to the method of ASTM D6474-99.

The term "unimodal" is herein defined to mean there will be only one significant peak or maximum evident in the GPC-curve. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In embodiments of the disclosure, the bimodal polyethylene composition has a molecular weight distribution, $M_w/M_n$ of ≤6.5, or <6.5, or ≤6.0, or <6.0, or 5.5, or <5.5, or ≤5.0, or <5.0, or ≤4.5, or <4.5, or ≤4.0, or <4.0, or ≤3.5, or <3.5. In further embodiments of the disclosure, the bimodal polyethylene composition has a molecular weight distribution, $M_w/M_n$ of from 1.7 to 6.5, including any narrower ranges within this range and any values encompassed by these ranges. For example, in embodiments of the disclosure, the bimodal polyethylene composition has a molecular weight distribution, $M_w/M_n$ of from 1.8 to 6.5, or from 1.8 to 6.0, or from 1.8 to 5.5, or from 1.8 to 5.0, or from 1.8 to 4.5, or from 1.8 to 4.0, or from 1.8 to 3.5, or from 2.0 to 6.5, or from 2.0 to 6.0, or from 2.0 to 5.5, or from 2.0 to 5.0, or from 2.0 to 4.5, or from 2.0 to 4.0, or from 2.0 to 3.5.

In embodiments of the disclosure, the bimodal polyethylene copolymer composition has a density of ≥0.940 g/cm$^3$, or >0.940 g/cm$^3$, ≥0.941 g/cm$^3$, or >0.941 g/cm$^3$.

In embodiments of the disclosure, the bimodal polyethylene composition has a density of from 0.939 to 0.965 g/cm$^3$, including any narrower ranges within this range and any values encompassed by these ranges. For example, in embodiments of the disclosure, the bimodal polyethylene composition has a density of from 0.939 to 0.960 g/cm$^3$, or from 0.940 to 0.965 g/cm$^3$, or from 0.940 to 0.960 g/cm$^3$, or from 0.940 to 0.955 g/cm$^3$, or from 0.940 to 0.950 g/cm$^3$, or from 0.940 to 0.949 g/cm$^3$, or from 0.940 to 0.948 g/cm$^3$, or from 0.941 to 0.960 g/cm$^3$, or from 0.941 to 0.955 g/cm$^3$, or from 0.941 to 0.950 g/cm$^3$, or from 0.941 to 0.949 g/cm$^3$, or from 0.941 to 0.948 g/cm$^3$, or from 0.942 to 0.960 g/cm$^3$, or from 0.942 to 0.955 g/cm$^3$, or from 0.942 to 0.950 g/cm$^3$, or from 0.942 to 0.949 g/cm$^3$, or from 0.942 to 0.948 g/cm$^3$.

In an embodiment of the disclosure, the bimodal polyethylene composition has a density of from greater than 0.940 g/cm$^3$ to 0.949 g/cm$^3$.

In an embodiment of the disclosure, the bimodal polyethylene composition has a density of from greater than 0.940 g/cm$^3$ to 0.948 g/cm$^3$.

In embodiments of the disclosure the bimodal polyethylene composition has a melt index, $I_2$ of at least 5.0 g/10 min (≥5.0 g/10 min), or at least 5.5 g/10 min (≥5.5 g/10 min), or at least 6.0 g/10 min (≥6.0 g/10 min), or greater than 5.0 g/10 min (>5.0 g/10 min), or greater than 5.5 g/10 min (>5.5 g/10 min), or greater than 6.0 g/10 min (>6.0 g/10 min). In further embodiments of the disclosure, the bimodal polyethylene composition has a melt index, $I_2$ of from 5.0 to 15.0 g/10 min, including any narrower ranges within this range and any values encompassed by these ranges. For example, in embodiments of the disclosure, the melt index, $I_2$ of the bimodal polyethylene composition may be from 5.0 to 12.0 g/10 min, or from 5.0 to 10.0 g/10 min, or from 5.5 to 12.0 g/10 min, or from 6.0 to 12.0 g/10 min, or from 5.5 to 10.0 g/10 min, or from 6.0 to 10.0 g/10 min, or from 5.5 to 7.5 g/10 min, or from 6.0 to 8.0 g/10 min, or from 6.0 to 7.5 g/10 min, or from 6.0 to 7.0 g/10 min.

In embodiments of the disclosure the bimodal polyethylene composition has a high load melt index, $I_{21}$ of at least 150 g/10 min (≥150 g/10 min), or at least 200 g/10 min (≥200 g/10 min), or greater than 200 g/10 min (>200 g/10 min), or at least 250 g/10 min (≥250 g/10 min), or greater than 250 g/10 min (>250 g/10 min), or at least 300 g/10 min (≥300 g/10 min), or greater than 300 g/10 min (>300 g/10 min). In further embodiments of the disclosure, the bimodal polyethylene composition has a high load melt index, $I_{21}$ of from 175 to 1200 g/10 min, including any narrower ranges within this range and any values encompassed by these ranges. For example, in embodiments of the disclosure, the high load melt index, $I_{21}$ of the bimodal polyethylene composition may be from 175 to 1000 g/10 min, or from 200 to 750 g/10 min, from 250 to 1000 g/10 min, or from 250 to 750 g/10 min, or from 275 to 1000 g/10 min, or from 275 to 750 g/10 min, or from 300 to 1000 g/10 min, or from 300 to 750 g/10 min, or from 250 to 500 g/10 min, or from 300 to 500 g/10 min.

In embodiments of the disclosure the bimodal polyethylene composition has a melt flow ratio, $I_{21}/I_2$ of ≤75, or <75, or ≤65, or <65, or ≤60, or <60. In further embodiments of the disclosure the bimodal polyethylene composition has a melt flow ratio, $I_{21}/I_2$ of from 35 to 85, including any narrower ranges within this range and any values encompassed by these ranges. For example, in embodiments of the disclosure, the bimodal polyethylene composition has a melt flow ratio, $I_{21}/I_2$ of from 40 to 75, or from 45 to 75, or from 40 to 70, or from 45 to 70, or from 45 to 65.

In an embodiment of the disclosure, the bimodal polyethylene composition will have a reverse or partially reverse comonomer distribution profile as measured using GPC- FTIR. If the comonomer incorporation decreases with molecular weight, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for a copolymer, there is one or more higher molecular weight components having a higher comonomer incorporation than in one or more lower molecular weight components. The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

In an embodiment of the disclosure the bimodal polyethylene composition has a reversed comonomer distribution profile as measured using GPC-FTIR.

In an embodiment of the disclosure the bimodal polyethylene composition has a partially reversed comonomer distribution profile as measured using GPC-FTIR.

In embodiments of the disclosure, the bimodal polyethylene composition has a $CDBI_{50}$ of from about 40 to 85 weight %, or from about 45 to 85 weight %, or from about 50 to about 80 weight %, or from about 40 to about 70 weight %, or from about 45 to about 65 weight %.

In embodiments of the disclosure, the upper limit on the parts per million (ppm) of hafnium in the bimodal polyethylene composition may be about 3.0 ppm, or about 2.5 ppm, or about 2.4 ppm, or about 2.0 ppm, or about 1.5 ppm, or about 1.0 ppm, or about 0.75 ppm, or about 0.5 ppm. In embodiments of the disclosure, the lower limit on the parts per million (ppm) of hafnium in the bimodal polyethylene composition may be about 0.0015 ppm, or about 0.0050 ppm, or about 0.0075 ppm, or about 0.010 ppm, or about 0.015 ppm, or about 0.030 ppm, or about 0.050 ppm, or about 0.075 ppm, or about 0.100 ppm, or about 0.150 ppm, or about 0.175 ppm, or about 0.200 ppm.

In embodiments of the disclosure, the bimodal polyethylene composition has from 0.0015 to 2.4 ppm of hafnium, or from 0.0050 to 2.4 ppm of hafnium, or from 0.0075 to 2.4 ppm of hafnium, or from 0.010 to 2.4 ppm of hafnium, or from 0.015 to 2.4 ppm of hafnium, or from 0.050 to 3.0 ppm of hafnium, or from 0.050 to 2.4 ppm, or from 0.075 to 2.4 ppm of hafnium, or from 0.075 to 2.0 ppm of hafnium, or from 0.075 to 1.5 ppm of hafnium, or from 0.075 to 1.0 ppm of hafnium, or from 0.075 to 0.75 ppm of hafnium, or from 0.100 to 2.0 ppm of hafnium, or from 0.100 to 1.5 ppm of hafnium, or from 0.100 to 1.0 ppm of hafnium, or from 0.100 to 0.75 ppm of hafnium, or from 0.20 to 2.0 ppm of hafnium, or from 0.20 to 1.5 ppm of hafnium, or from 0.20 to 1.0 ppm of hafnium, or from 0.20 to 0.75 ppm of hafnium, or from 0.35 to 2.0 ppm of hafnium, or from 0.35 to 1.5 ppm of hafnium, or from 0.35 to 1.0 ppm of hafnium, or from 0.35 to 0.75 ppm of hafnium.

In embodiments of the disclosure, the bimodal polyethylene composition has at least 0.0015 ppm of hafnium, or at least 0.005 ppm of hafnium, or at least 0.0075 ppm of hafnium, or at least 0.015 ppm of hafnium, or at least 0.030 ppm of hafnium, or at least 0.050 ppm of hafnium, or at least 0.075 ppm of hafnium, or at least 0.100 ppm of hafnium, or at least 0.125 ppm of hafnium, or at least 0.150 ppm of hafnium, or at least 0.175 ppm of hafnium, or at least 0.200 ppm of hafnium, or at least 0.300 ppm of hafnium, or at least 0.350 ppm of hafnium.

In an embodiment of the disclosure, the bimodal polyethylene composition contains long chain branching characterized by the long chain branching factor, LCBF disclosed herein. In embodiments of the disclosure, the upper limit on the LCBF of the bimodal polyethylene copolymer may be 0.5000, or 0.4000, or 0.3000 (dimensionless). In embodiments of the disclosure, the lower limit on the LCBF of the bimodal polyethylene copolymer may be 0.0010, or 0.0020, or 0.0050, or 0.0070, or 0.0090 (dimensionless).

In embodiments of the disclosure, the LCBF of the bimodal polyethylene copolymer is at least 0.0010, or at least 0.0020, or at least 0.0050, or at least 0.0070, or at least 0.0090.

In embodiments of the disclosure, the LCBF of the bimodal polyethylene copolymer is >0.0010, or >0.0020, or >0.0050, or >0.0070, or >0.0090, or >0.0100.

In embodiments of the disclosure, the LCBF of the bimodal polyethylene copolymer may be from 0.0010 to 0.5000, or from 0.0010 to 0.1000 or from 0.0050 to 0.5000, or from 0.0050 to 0.1000, or from 0.0070 to 0.5000, or from 0.0050 to 0.2500, or from 0.0070 to 0.2500, or from 0.0100 to 0.5000, or from 0.0050 to 0.1000, or from 0.0070 to 0.1000, or from 0.0090 to 0.1000.

In embodiments of the disclosure, the bimodal polyethylene composition or a plaque made from the bimodal polyethylene composition has an environmental stress crack resistance, ESCR at condition A in 100% IGEPAL CO-630 of greater than 700 hours, or greater than 800 hours, or greater than 900 hours, or greater than 1000 hours, or greater than 1100 hours.

In embodiments of the disclosure, the bimodal polyethylene composition or a plaque made from the bimodal polyethylene composition has an environmental stress crack resistance, ESCR at condition B in 100% IGEPAL CO-630 of greater than 700 hours, or greater than 800 hours, or greater than 900 hours, or greater than 1000 hours, or greater than 1100 hours.

In embodiments of the disclosure, the bimodal polyethylene composition or a plaque made from the bimodal polyethylene composition has an environmental stress crack resistance, ESCR determined at both condition A and at condition B, in 100% IGEPAL CO-630, of greater than 700 hours, or greater than 800 hours, or greater than 900 hours, or greater than 1000 hours, or greater than 1100 hours.

In embodiments of the disclosure, the bimodal polyethylene composition or a plaque made from the bimodal polyethylene composition has an environmental stress crack resistance, ESCR determined at either condition A or at condition B, in 100% IGEPAL CO-630, of greater than 700 hours, or greater than 800 hours, or greater than 900 hours, or greater than 1000 hours, or greater than 1100 hours.

In embodiments of the disclosure, the bimodal polyethylene composition has a zero shear viscosity, $\eta_0$ at 190° C. of from about 750 Pa·s to about 5000 Pa·s, including any narrower ranges within this range and any values encompassed by these ranges. For example, in embodiments of the disclosure, the bimodal polyethylene composition has a zero shear viscosity, $\eta_0$ at 190° C. of from about 1000 Pa·s to about 4500 Pa·s, or from about 1000 Pa·s to about 4000 Pa·s, or from about 1000 Pa·s to about 3500 Pa·s, or from about 1000 Pa·s to about 3000 Pa·s, or from about 1500 Pa·s to about 3500 Pa·s, or from about 1500 Pa·s to about 3000 Pa·s, or from about 1750 Pa·s to about 2750 Pa·s, or from about 1750 Pa·s to about 2500 Pa·s, or from about 2000 Pa·s to about 2500 Pa·s.

In embodiments of the disclosure, the bimodal polyethylene composition has a melt strength of at least 0.6 cN, or at least 0.7 cN, or at least 0.8 cN, or at least 0.85 cN, or at least 0.9 cN.

In embodiments of the disclosure, the bimodal polyethylene composition has a melt strength stretch ratio of greater than 1100, or greater than 1200, or greater than 1250, or at least 1100, or at least 1200, or at least 1250.

In embodiments of the disclosure, the bimodal ethylene composition or a plaque made from the bimodal ethylene composition has a flexural secant modulus at 1%, of at least 750 MPa, or greater than 750 MPa, or at least 800 MPa, or greater than 800 MPa, or at least 850 MPa, or greater than 850 MPa, or at least 900 MPa, or greater than 900 MPa, or at least 950 MPa, or greater than 950 MPa. In further embodiments of the disclosure the bimodal polyethylene composition has a flexural secant modulus at 1% of from 750 to 1200 MPa, including any narrower ranges within this range and any values encompassed by these ranges. For example, in embodiments of the disclosure, the bimodal polyethylene composition has a flexural secant modulus at 1% of from 800 to 1100 MPa, or from 850 to 1050 MPa, or from 850 to 1000 MPa, or from 900 to 1100 MPa, or from 900 to 1050 MPa, or from 900 to 1000 MPa.

In embodiments of the disclosure, the bimodal ethylene composition or a plaque made from the bimodal ethylene composition has a tensile secant modulus at 1%, of at least 750 MPa, or greater than 750 MPa, or at least 800 MPa, or greater than 800 MPa, or at least 850 MPa, or greater than 850 MPa, or at least 900 MPa, or greater than 900 MPa, or at least 950 MPa. In further embodiments of the disclosure the bimodal polyethylene composition has a tensile secant modulus at 1% of from 750 to 1200 MPa, including any narrower ranges within this range and any values encompassed by these ranges. For example, in embodiments of the disclosure, the bimodal polyethylene composition has a tensile secant modulus at 1% of from 800 to 1100 MPa, or from 850 to 1050 MPa, or from 850 to 1000 MPa, or from 900 to 1100 MPa, or from 900 to 1050 MPa, or from 900 to 1000 MPa.

In embodiments of the disclosure, the bimodal ethylene composition or a plaque made from the bimodal ethylene composition has an IZOD Impact strength of ≥3 foot·pound/inch, or ≥3 foot·pound/inch, or ≥5 foot·pound/inch, or ≥5 foot·pound/inch, or ≥6 foot·pound/inch, or ≥6 foot·pound/inch, or ≥7 foot·pound/inch, or ≥7 foot·pound/inch. In further embodiments of the disclosure the bimodal polyethylene composition has an IZOD impact strength of from 3 to 12 foot·pound/inch, including any narrower ranges within this range and any values encompassed by these ranges. For example, in embodiments of the disclosure, the bimodal polyethylene composition has an IZOD impact strength of from 3 to 10 foot·pound/inch, or from 5 to 12 foot·pound/inch, or from 5 to 10 foot·pound/inch.

In embodiments of the disclosure, the bimodal ethylene composition or a plaque made from the bimodal ethylene composition has a Tensile Impact strength of ≥140 foot·pound/inch$^2$, or ≥160 foot·pound/inch$^2$, or ≥180 foot·pound/inch$^2$, or ≥200 foot·pound/inch$^2$. In embodiments of the disclosure, the bimodal ethylene composition or a plaque made from the bimodal ethylene composition has a Tensile Impact strength of from 140 to 250 foot·pound/inch$^2$, or from 160 to 250 foot·pound/inch$^2$, or from 180 to 250 foot·pound/inch$^2$, or from 160 to 240 foot·pound/inch$^2$, or from 180 to 220 foot·pound/inch$^2$.

In embodiments of the disclosure, the bimodal polyethylene composition or a plaque made from the bimodal ethylene composition has an environmental stress crack resistance, ESCR at condition A in 100% IGEPAL CO-630 of greater than 750 hours, or greater than 850 hours, or greater than 900 hours, or greater than 950 hours, or greater than 1000 hours.

In embodiments of the disclosure, the bimodal polyethylene composition or a plaque made from the bimodal ethylene composition has an environmental stress crack resistance, ESCR at condition B in 100% IGEPAL CO-630 of greater than 750 hours, or greater than 850 hours, or greater than 900 hours, or greater than 950 hours, or greater than 1000 hours.

Optionally, additives can be added to the bimodal polyethylene composition. Additives can be added to the bimodal polyethylene composition during an extrusion or compounding step, but other suitable known methods will be apparent to a person skilled in the art. The additives can be added as is or as part of a separate polymer component (i.e., not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents (including nucleators, pigments or any other chemicals which may provide a nucleating effect to the bimodal polyethylene composition). The additives that can be optionally added are typically added in amount of up to 20 weight percent (wt %).

One or more nucleating agent(s) may be introduced into the bimodal polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated.

Examples of nucleating agents which are commercially available and which may be added to the bimodal polyethylene composition are dibenzylidene sorbital esters (such as the products sold under the trademark MILLAD® 3988 by Milliken Chemical and IRGACLEAR® by Ciba Specialty Chemicals). Further examples of nucleating agents which may added to the bimodal polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the bimodal polyethylene composition include those disclosed in WO2015042561, WO2015042563, WO2015042562 and WO2011050042.

Many of the above described nucleating agents may be difficult to mix with the bimodal polyethylene composition that is being nucleated and it is known to use dispersion aids, such as for example, zinc stearate, to mitigate this problem.

In an embodiment of the disclosure, the nucleating agents are well dispersed in the bimodal polyethylene composition.

In an embodiment of the disclosure, the amount of nucleating agent used is comparatively small (from 5 to 3000 parts by million per weight (based on the weight of the bimodal polyethylene composition)) so it will be appreciated by those skilled in the art that some care must be taken to ensure that the nucleating agent is well dispersed. In an embodiment of the disclosure, the nucleating agent is added in finely divided form (less than 50 microns, especially less than 10 microns) to the bimodal polyethylene composition to facilitate mixing. This type of "physical blend" (i.e., a mixture of the nucleating agent and the resin in solid form) is generally preferable to the use of a "masterbatch" of the nucleator (where the term "masterbatch" refers to the practice of first melt mixing the additive—the nucleator, in this case—with a small amount of the bimodal polyethylene composition resin—then melt mixing the "masterbatch" with the remaining bulk of the bimodal polyethylene composition resin).

In an embodiment of the disclosure, an additive such as nucleating agent may be added to the bimodal polyethylene composition by way of a "masterbatch", where the term "masterbatch" refers to the practice of first melt mixing the additive (e.g., a nucleator) with a small amount of the bimodal polyethylene composition, followed by melt mixing the "masterbatch" with the remaining bulk of the bimodal polyethylene composition.

In an embodiment of the disclosure, the polymer composition further comprises a nucleating agent or a mixture of nucleating agents.

In an embodiment of the disclosure, the bimodal polyethylene composition is used in the formation of molded articles. For example, articles formed by rotomolding, continuous compression molding and injection molding are contemplated. Such articles include, for example, tanks from rotomolding, and caps, screw caps, and closures for bottles from compression or injection molding. However, a person skilled in the art will readily appreciate that the compositions described above may also be used for other applications such as, but not limited to, film, injection blow molding, blow molding, and sheet extrusion applications.

In an embodiment, the bimodal polyethylene composition disclosed herein may be converted into molded articles.

In an embodiment, the bimodal polyethylene composition disclosed herein may be converted into rotomolded articles.

In another embodiment, and as an alternative to rotomolding, the bimodal polyethylene composition of the present disclosure may be used to manufacture articles by compression molding or injection molding processes.

In an embodiment, the bimodal polyethylene composition disclosed herein may be converted into a cap or closure.

In an embodiment, the bimodal polyethylene composition disclosed herein may be converted into foamed articles.

Foamed Articles

Polyethylene foam is typically characterized based on its density. Soft, or low density polyethylene foam is typically prepared from a polyethylene resin which is also characterized by having a low density. Rigid foam on the other hand, can be used in structural applications. Rigid polyethylene foam, characterized by having a higher density, generally provides higher tensile and compressive strength than lower density polyethylene foam. Foamed polyolefins may afford advantages in the design of molded parts as they provide opportunities to reduce the overall part weight as well as improve insulation properties, both thermal and acoustic. High pressure low density polyethylene (HPLDPE) is often used in the preparation of soft foam articles. Linear low density polyethylene polymers (LLDPE) are also used in various foam applications. The choice of resin, blowing agent, molding equipment and part design all contribute to the performance of the molded part.

Known processes used to prepare polyolefin foams include sheet extrusion, blown film and cast film extrusion, injection molding, rotational molding, and compression molding, and all of these processes are contemplated for use in embodiments of the present disclosure to prepare a foamed article using the bimodal polyethylene composition disclosed herein.

As is known to persons skilled in the art, a blowing agent is used to produce a foamed polyethylene structure and the blowing agent can either be physical or chemical in nature. Physical blowing agents are gases which are typically first dissolved in the polymer melt and subsequently separated when forming a cellular structure with changes in the pressure (decompression) during the foaming process. Examples of physical blowing agents include nitrogen, argon, carbon dioxide, fluorocarbons, helium, and hydrocarbons such as butanes and pentanes. Chemical blowing agents are chemicals which decompose during the foaming operation to produce gas which in turns forms the cellular structure. Examples of such chemical blowing agents include synthetic azo-, carbonate-, and hydrazide-based molecules. Typically, decomposition of the blowing agent liberates gas such as nitrogen, carbon dioxide, and/or wager (steam). During the foaming process, the chemical blowing agent may be activated by heating the mixture to a temperature above its decomposition temperature. The amount of chemical blowing agent in the foamable polyethylene composition is usually chosen based on the foam density required.

It is well known that higher melt strength generally improves the polymer foaming process and the foam quality. High pressure low density polyethylene (HPLDPE) typically contains long chain branching which may improve melt strength and facilitates the foaming process. HPLDPE resins may, however, be limited in their end use application by their relatively low density. In contrast and without wishing to be bound by theory, the bimodal polyethylene composition of the present disclosure present rheological characteristics and melt strengths that may are desirable for foaming applications.

Rotomolded Articles

Typically, for use in a rotational molding process, the bimodal polyethylene composition can be manufactured in powder or pellet form. The rotational molding process may additionally comprise process steps for manufacturing the bimodal polyethylene composition. For rotational molding, powders are preferably used and may have a particle size smaller than or equal to 35 US mesh. The grinding may be done cryogenically, if necessary. Thereafter, a polymer powder is placed inside a hollow mold and then heated within the mold as the mold is rotated. A mold is usually rotated biaxially, i.e., rotated about two perpendicular axes simultaneously. A mold is typically heated externally (generally with a forced air circulating oven). Generally, rotomolding process steps include: tumbling, heating and melting of a polymer powder, followed by coalescence, fusion or sintering and cooling to remove the molded article.

The bimodal polyethylene composition of the present disclosure may in certain embodiments of the disclosure, be processed in commercial rotational molding machines. The time and temperatures used will depend upon factors including the thickness of the part being rotomolded, and one skilled in the art can readily determine suitable processing conditions. By way of providing some non-limiting examples, the oven temperature range during the heating step may be from 400° F. to 800° F., or from about 500° F. to about 700° F., or from about 575° F. to about 650° F.

After the heating step the mold is cooled. The part must be cooled enough to be easily removed from the mold and to retain its shape. The mold may be removed from the oven while continuing to rotate. Cool air is first blown on the mold. The air may be at ambient temperature. After the air has started to cool the mold for a controlled time period, a water spray may be used. The water cools the mold more rapidly. The water used may be at cold tap water temperature, for example it may be from about 4° C. (40° F.) to about 16° C. (60° F.). After the water cooling step, another air cooling step may be used. This may be a short step during which the equipment dries with heat removal during the evaporation of the water.

The heating and cooling cycle times will depend on the equipment used and the article being molded. Specific factors include the part thickness in the mold material. By way of providing a non-limiting example, conditions for an 18 inch thick part in a steel mold may be, to heat the mold in the oven with air at about 316° C. (600° F.) for about 15 minutes; the part may then be cooled in ambient temperature forced air for about 8 minutes and then a tap water spray at about 10° C. (50° F.) for about 5 minutes; optionally, the part may be cooled in ambient temperature forced air for an additional 2 minutes.

During the heating and cooling steps the mold containing the molded article is preferably continually rotated. Typically this is done along two perpendicular axes. The rate of rotation of the mold about each axis is limited by machine capability and the shape of the article being molded. A typical, non-limiting range of operations which may be used with the present disclosure is to have the ratio of rotation of the major axis to the minor axis of about 1:8 to 10:1 or from about 1:2 to 8:1.

Non-limiting examples of articles which can be made using a rotomolding process include custom tanks, water tanks, carts, transportation cases and containers, coolers, as well as sports and recreation equipment (e.g. boats, kayaks), toys, and playground equipment.

The desired physical properties of rotomolded articles depend on the application of interest. Non-limiting examples of desired properties include: flexural modulus (1% and 2% secant modulus); environmental stress crack resistance (ESCR); shore hardness; heat deflection temperature (HDT); VICAT softening point; IZOD impact strength; ARM impact resistance; and color (whiteness and/or yellowness index).

In an embodiment of the disclosure, a bimodal polyethylene composition having a melt index ($I_2$) of more than about 6 g/10 min is used to prepare rotomolded articles having an interior volume of below about 100 liters.

In an embodiment of the disclosure, a bimodal polyethylene composition having a melt index ($I_2$) of from about 6 to 12 g/10 min is used to prepare rotomolded articles having an interior volume of below about 50 liters.

In an embodiment of the disclosure a process for making a rotomolded article comprises the following steps: (i) charging the bimodal polyethylene composition into a mold; (ii) heating the mold in an oven to a temperature of more than 280° C.; (iii) rotating the mold around at least 2 axes; (iv) cooling the mold while the mold is rotating; and (v) opening the mold to release the rotomolded article.

Additives and Adjuvants—Rotomolded Articles

The bimodal polyethylene compositions and the manufactured rotomolded articles described may optionally include, depending on its intended use, additives and adjuvants. Additives can be added to the bimodal polyethylene composition during an extrusion or compounding step, but other suitable known methods will be apparent to a person skilled in the art. The additives can be added as is or as part of a separate polymer component added during an extrusion or compounding step. Non-limiting examples of additives and adjuvants include, anti-blocking agents, antioxidants, heat stabilizers, slip agents, processing aids, anti-static additives, colorants, dyes, filler materials, light stabilizers, heat stabilizers, light absorbers, lubricants, pigments, plasticizers, nucleating agents and combinations thereof. Non-limiting examples of suitable primary antioxidants include IRGANOX® 1010 [CAS Reg. No. 6683-19-8] and IRGANOX 1076 [CAS Reg. No. 2082-79-3]; both available from BASF Corporation, Florham Park, NJ, U.S.A. Non-limiting examples of suitable secondary antioxidants include IRGAFOS® 168 [CAS Reg. No. 31570-04-4], available from BASF Corporation, Florham Park, NJ, U.S.A.; WESTON® 705 [CAS Reg. No. 939402-02-5], available from Addivant, Danbury CT, U.S.A.; and DOVERPHOS® Igp-11 [CAS Reg. No. 1227937-46-3] available form Dover Chemical Corporation, Dover OH, U.S.A. The additives that can be optionally added are typically added in amount of up to 20 weight percent (wt %).

One or more nucleating agent(s) may be introduced into the bimodal polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated.

In embodiments of the disclosure, the bimodal polyethylene composition and the manufactured rotomolded articles described may include additives selected from the group comprising antioxidants, phosphites and phosphonites, nitrones, antacids, UV light stabilizers, UV absorbers, metal deactivators, dyes, fillers and reinforcing agents, nano-scale organic or inorganic materials, antistatic agents, release agents such as zinc stearates, and nucleating agents (including nucleators, pigments or any other chemicals which may provide a nucleating effect to the bimodal polyethylene composition).

In embodiments of the disclosure, the additives that can be added are added in an amount of up to 20 weight percent (wt %).

Additives can be added to the bimodal polyethylene composition during an extrusion or compounding step, but other suitable known methods will be apparent to a person skilled in the art. The additives can be added as is or as part of a separate polymer component added during an extrusion or compounding step.

A more detailed list of additives which may be added to the bimodal polyethylene composition of the present disclosure and which are used in rotomolded articles follows:

Phosphites (e.g. Aryl Monophosphite)

As used herein, the term aryl monophosphite refers to a phosphite stabilizer which contains: (1) only one phosphorus atom per molecule; and (2) at least one aryloxide (which may also be referred to as phenoxide) radical which is bonded to the phosphorus.

In an embodiment of the disclosure, aryl monophosphites contain three aryloxide radicals—for example, tris phenyl phosphite is the simplest member of this preferred group of aryl monophosphites.

In another embodiment of the disclosure, aryl monophosphites contain $C_1$ to $C_{10}$ alkyl substituents on at least one of the aryloxide groups. These substituents may be linear (as in the case of nonyl substituents) or branched (such as isopropyl or tertiary butyl substituents).

Non-limiting examples of aryl monophosphites which may be used in embodiments of the disclosure, include those selected from triphenyl phosphite; diphenyl alkyl phosphites; phenyl dialkyl phosphites; tris(nonylphenyl) phosphite [WESTON 399, available from GE Specialty Chemicals]; tris(2,4-di-tert-butylphenyl) phosphite [IRGAFOS 168, available from Ciba Specialty Chemicals Corp.]; and bis(2,4-di-tert-butyl-6-methylphenyl) ethyl phosphite [IRGAFOS 38, available from Ciba Specialty Chemicals Corp.]; and 2,2',2"-nitrilo[triethyltris(3,3'5,5'-tetra-tert-butyl-1,1'-biphenyl-2,2'-diyl) phosphite [IRGAFOS 12, available from Ciba Specialty Chemicals Corp.].

In embodiments of the disclosure, the amount of aryl monophosphite added to the bimodal polyethylene composition product is added in from 200 to 2,000 ppm (based on the weight of the polymer), or from 300 to 1,500 ppm, or from 400 to 1,000 ppm.

Phosphites, Phosphonites (e.g. Diphosphite, Diphosphonite)

As used herein, the term diphosphite refers to a phosphite stabilizer which contains at least two phosphorus atoms per phosphite molecule (and, similarly, the term diphosphonite refers to a phosphonite stabilizer which contains at least two phosphorus atoms per phosphonite molecule).

Non-limiting examples of diphosphites and diphosphonites which may be used in embodiments of the disclosure include those selected from distearyl pentaerythritol diphosphite, diisodecyl pentaerythritol diphosphite, bis(2,4 di-tert-butylphenyl) pentaerythritol diphosphite [ULTRANOX® 626, available from GE Specialty Chemicals]; bis(2,6-di-tert-butyl-4-methylpenyl) pentaerythritol diphosphite; bisisodecyloxy-pentaerythritol diphosphite, bis(2,4-di-tert-butyl-6-methylphenyl) pentaerythritol diphosphite, bis(2,4,6-tri-tert-butylphenyl) pentaerythritol diphosphite, tetrakis (2,4-di-tert-butylphenyl)4,4'-bipheylene-diphosphonite [IRGAFOS P-EPQ, available from Ciba] and bis(2,4-dicumylphenyl)pentaerythritol diphosphite [DOVERPHOS S9228-T or DOVERPHOS S9228-CT] and PEPQ® (CAS No 119345-01-06), which is an example of a commercially available diphosphonite.

In embodiments of the disclosure, the diphosphite and/or diphosphonite added to the bimodal polyethylene composition is added in from 200 ppm to 2,000 ppm (based on the weight of the polymer), or from 300 to 1,500 ppm, or from 400 to 1,000 ppm.

In an embodiment of the disclosure, the use of diphosphites is preferred over the use of diphosphonites.

In an embodiment of the disclosure, the most preferred diphosphites are those available under the trademarks DOVERPHOS S9228-CT and ULTRANOX 626.

Hindered Phenolic Antioxidant

The hindered phenolic antioxidant may be any of the molecules that are conventionally used as primary antioxidants for the stabilization of polyolefins. Suitable examples include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4isobutylphenol; 2,6-dicyclopentyl-4-methylphenol; 2-(.alpha.-methylcyclohexyl)-4,6 dimethylphenol; 2,6-di-octadecyl-4-methylphenol; 2,4,6,-tricyclohexyphenol; and 2,6-di-tert-butyl-4-methoxymethylphenol.

Two (non limiting) examples of suitable hindered phenolic antioxidants which can be used in embodiments of the disclosure, are sold under the trademarks IRGANOX 1010 (CAS Registry number 6683-19-8) and IRGANOX 1076 (CAS Registry number 2082-79-3) by BASF Corporation.

In an embodiment of the disclosure, the amount of hindered phenolic antioxidant added to the bimodal polyethylene composition is added in from 100 to 2000 ppm, or from 400 to 1000 ppm (based on the weight of the polymer).

Long Term Stabilizers

Plastic parts which are intended for long term use, can in embodiments of the present disclosure, contain at least one Hindered Amine Light Stabilizer (HALS). HALS are well known to those skilled in the art.

When employed, the HALS may in an embodiment of the disclosure be a commercially available material and may be used in a conventional manner and in a conventional amount.

Commercially available HALS which may be used in embodiments of the disclosure include those sold under the trademarks CHIMASSORB® 119; CHIMASSORB 944; CHIMASSORB 2020; TINUVIN© 622 and TINUVIN 770 from Ciba Specialty Chemicals Corporation, and CYASORB® UV 3346, CYASORB UV 3529, CYASORB UV 4801, and CYASORB UV 4802 from Cytec Industries. In some embodiments of the disclosure, TINUVIN 622 is preferred. In other embodiments of the disclosure, the use of mixtures of more than one HALS are also contemplated.

In embodiments of the disclosure, suitable HALS include those selected from bis(2,2,6,6-tetramethylpiperidyl)-sebacate; bis-5(1,2,2,6,6-pentamethylpiperidyl)-sebacate; n-butyl-3,5-di-tert-butyl-4-hydroxybenzyl malonic acid bis (1,2,2,6,6,-pentamethylpiperidyl)ester; condensation product of 1-hydroxyethyl-2,2,6,6-tetramethyl-4-hydroxy-piperidine and succinic acid; condensation product of N,N'-(2,2,6,6-tetramethylpiperidyl)-hexamethylendiamine and 4-tert-octylamino-2,6-dichloro-1,3,5-s-triazine; tris-(2,2,6,6-tetramethylpiperidyl)-nitrilotriacetate, tetrakis-(2,2,6,6-tetramethyl-4-piperidyl)-1,2,3,4butane-tetra-arbonic acid; and 1,1'(1,2-ethanediyl)-bis-(3,3,5,5-tetramethylpiperazinone).

Hydroxylamines

It is known to use hydroxylamines and derivatives thereof (including amine oxides) as additives for polyethylene compositions used to prepare rotomolded parts, as disclosed in for example U.S. Pat. No. 6,444,733 and in embodiments of the present disclosure, the hydroxylamines and derivatives disclosed in this patent may also be suitable for use.

In an embodiment of the disclosure, a useful hydroxylamine for inclusion in the bimodal polyethylene composition can be selected from N,N-dialkylhydroxylamines, a commercially available example of which is the N,N-di(alkyl) hydroxylamine sold as IRGASTAB 042 (by BASF) and which is reported to be prepared by the direct oxidation of N,N-di(hydrogenated) tallow amine.

In an embodiment of the disclosure, the bimodal polyethylene composition contains an additive package comprising: a hindered monophosphite; a diphosphite; a hindered amine light stabilizer, and at least one additional additive selected from the group consisting of a hindered phenol and a hydroxylamine.

Cap or Closure as Molded Article

In an embodiment of the disclosure, the bimodal polyethylene composition is used in the formation of any closure, of any suitable design and dimensions for use in sealing any suitable bottle, container or the like.

In an embodiment of the disclosure, the bimodal polyethylene compositions are used in the formation of a closure for bottles, containers, pouches and the like. For example, closures for bottles formed by continuous compression molding, or injection molding are contemplated. Such closures include, for example, hinged caps, hinged screw caps, hinged snap-top caps, and hinged closures for bottles, containers, pouches and the like.

In an embodiment of the disclosure, a closure (or cap) is a screw cap for a bottle, container, pouches and the like.

In an embodiment of the disclosure, a closure (or cap) is a snap closure for a bottle, container, pouches and the like.

In an embodiment of the disclosure, a closure (or cap) comprises a hinge made of the same material as the rest of the closure (or cap).

In an embodiment of the disclosure, a closure (or cap) is hinged closure.

In an embodiment of the disclosure, a closure (or cap) is a hinged closure for bottles, containers, pouches and the like.

In an embodiment of the disclosure, a closure (or cap) is a flip-top hinge closure, such as a flip-top hinge closure for use on a plastic ketchup bottle or similar containers containing foodstuffs.

When a closure is a hinged closure, it comprises a hinged component and generally consists of at least two bodies which are connected by a thinner section that acts as a hinge allowing the at least two bodies to bend from an initially molded position. The thinner section may be continuous or web-like, wide or narrow.

A useful closure (for bottles, containers and the like) is a hinged closure and may consist of two bodies joined to each other by at least one thinner bendable portion (e.g. the two bodies can be joined by a single bridging portion, or more than one bridging portion, or by a webbed portion, etc.). A first body may contain a dispensing hole and which may snap onto or screw onto a container to cover a container opening (e.g. a bottle opening) while a second body may serve as a snap on lid which may mate with the first body.

The caps and closures, of which hinged caps and closures and screw caps are a subset, can be made according to any known method, including for example injection molding and compression molding techniques that are well known to persons skilled in the art. Hence, in an embodiment of the disclosure a closure (or cap) comprising the bimodal polyethylene composition (described herein) is prepared with a process comprising at least one compression molding step and/or at least one injection molding step.

In one embodiment, the closures (including single piece or multi-piece variants and hinged variants) are well suited for sealing bottles, containers and the like, for examples bottles that may contain drinkable water, and other foodstuffs, including but not limited to liquids that are under an appropriate pressure (i.e. carbonated beverages or appropriately pressurized drinkable liquids).

The closures and caps may also be used for sealing bottles containing drinkable water or non-carbonated beverages (e.g. juice). Other applications, include caps and closures for bottles, containers and pouches containing foodstuffs, such as for example ketchup bottles and the like.

The closures and caps may be one-piece closures or two piece closures comprising a closure and a liner.

The closures and caps may also be of multilayer design, wherein the closure of cap comprises at least two layers at least one of which is made of the bimodal polyethylene compositions described herein.

In an embodiment of the disclosure the closure is made by continuous compression molding.

In an embodiment of the disclosure the closure is made by injection molding.

Further non-limiting details of the disclosure are provided in the following examples. The examples are presented for the purposes of illustrating selected embodiments of this disclosure, it being understood that the examples presented do not limit the claims presented.

EXAMPLES

Prior to testing, each specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Bimodal polyethylene composition densities were determined using ASTM D792-13 (Nov. 1, 2013).

Melt Index

The bimodal polyethylene composition melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively.

Herein, the term "stress exponent" or its acronym "S.Ex.", is defined by the following relationship:

$$S.Ex. = \log(I_6/I_2)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 minutes or g/10 min or dg/minutes or dg/min; these units are equivalent.

Gel Permeation Chromatography (GPC)

Bimodal polyethylene composition molecular weights, $M_n$, $M_w$ and $M_z$, as well the as the polydispersity ($M_w/M_n$), were determined using ASTM D6474-12 (Dec. 15, 2012). Polymer sample solutions (1 to 2 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a PL 220 high-temperature chromatography unit equipped with four SHODEX® columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC raw data were processed with the CIRRUS® GPC software. The GPC columns were calibrated with narrow distribution polystyrene standards. The polystyrene molecular weights were converted to polyethylene molecular weights using the Mark-Houwink equation, as described in ASTM D6474-12 (Dec. 15, 2012).

Triple Detection Size Exclusion Chromatography (3D-SEC)

Bimodal polyethylene composition samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four SHODEX columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 μL. The SEC raw data were processed with the CIRRUS GPC software, to produce absolute molar masses and intrinsic viscosity ([η]). The term "absolute" molar mass was used to distinguish 3D-SEC determined absolute molar masses from the molar masses determined by conventional SEC. The viscosity average molar mass (My) determined by 3D-SEC was used in the calculations to determine the Long Chain Branching Factor (LCBF).

GPC-FTIR

Bimodal polyethylene composition (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a WATERS® GPC 150C chromatography unit equipped with four SHODEX columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS® FTIR software and the polymer concentration and methyl content were calculated in real time with the Chemometric Software (PLS technique) associated with the OPUS. Then the polymer concentration and methyl content were acquired and baseline-corrected with the CIRRUS GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation; $N_E$=28000/M, and $N_E$ (M dependent) was subtracted from the raw GPC-FTIR data to produce the SCB/1000C (2-Methyl Corrected) GPC-FTIR data.

Unsaturation Content

The quantity of unsaturated groups, i.e., double bonds, in bimodal polyethylene composition was determined according to ASTM D3124-98 (vinylidene unsaturation, published March 2011) and ASTM D6248-98 (vinyl and trans unsaturation, published July 2012). A polymer sample was: a) first subjected to a carbon disulfide extraction to remove additives that may interfere with the analysis; b) the sample (pellet, film or granular form) was pressed into a plaque of uniform thickness (0.5 mm); and c) the plaque was analyzed by FTIR.

Comonomer Content: Fourier Transform Infrared (FTIR) Spectroscopy

The quantity of comonomer in a bimodal polyethylene composition was determined by FTIR and reported as the Short Chain Branching (SCB) content having dimensions of $CH_3$#/1000C (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Composition Distribution Branching Index (CDBI) by CTREF

The "Composition Distribution Branching Index" or "CDBI" of the disclosed Examples and Comparative Examples were determined using a crystal-TREF unit (a "CTREF" unit) commercially available form Polymer Char (Valencia, Spain). The acronym "TREF" refers to Temperature Rising Elution Fractionation. A sample of bimodal polyethylene composition (80 to 100 mg) was placed in the reactor of the Polymer Char crystal-TREF unit, the reactor was filled with 35 ml of 1,2,4-trichlorobenzene (TCB), heated to 150° C. and held at this temperature for 2 hours to dissolve the sample. An aliquot of the TCB solution (1.5 mL) was then loaded into the Polymer Char TREF column filled with stainless steel beads and the column was equilibrated for 45 minutes at 110° C. The bimodal polyethylene composition was then crystallized from the TCB solution, in the TREF column, by slowly cooling the column from 110° C. to 30° C. using a cooling rate of 0.09° C. per minute. The TREF column was then equilibrated at 30° C. for 30 minutes. The crystallized bimodal polyethylene composition was then eluted from the TREF column by passing pure TCB solvent through the column at a flow rate of 0.75 mL/minute as the temperature of the column was slowly increased from 30° C. to 120° C. using a heating rate of 0.25° C. per minute. Using Polymer Char software, a TREF distribution curve was generated as the polyethylene composition was eluted from the TREF column, i.e., a TREF distribution curve is a plot of the quantity (or intensity) of polymeric material eluting from the column as a function of TREF elution temperature. A $CDBI_{50}$ was calculated from the TREF distribution curve for each bimodal polyethylene composition analyzed. The "$CDBI_{50}$" is defined as the percent of polymer whose composition is within 50% of the median comonomer composition (25% on each side of the median comonomer composition); it is calculated from the TREF composition distribution curve and the normalized cumulative integral of the TREF composition distribution curve. Those skilled in the art will understand that a calibration curve is required to convert a TREF elution temperature to comonomer content, i.e., the amount of comonomer in the bimodal polyethylene composition fraction that elutes at a specific temperature. The generation of such calibration curves are described in the prior art, e.g., Wild, et al., J. Polym. Sci., Part B, Polym. Phys., Vol. 20 (3), pages 441-455.

Hexane Extractables

Hexane extractables was determined according to the Code of Federal Registration 21 CFR § 177.1520 Para (c) 3.1 and 3.2; wherein the quantity of hexane extractable material in a sample is determined gravimetrically.

Neutron Activation Analysis (NAA)

Neutron Activation Analysis, hereafter NAA, was used to determine catalyst residues in the bimodal polyethylene composition and was performed as follows. A radiation vial (composed of ultrapure polyethylene, 7 mL internal volume) was filled with a polymer sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and CI) or 3 to 5 hours for long half-life elements (e.g., Zr, Hf, Cr, Fe and Ni). The average thermal neutron flux within the reactor was $5\times10^{11}/cm^2/s$. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (ORTEC® model GEM55185, Advanced Measurement Technology Inc., Oak Ridge, Tenn., USA) and a multichannel analyzer (ORTEC model DSPEC Pro). The amount of each element in the sample was calculated from the gamma-ray spectrum and recorded in parts per million relative to the total weight of the polymer sample. The N.A.A. system was calibrated with SPECPURE® standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 m and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p. 228) or Carreau-Yasuda model (see K. Yasuda (1979) PhD Thesis, IT Cambridge). The dynamic rheological data were analyzed using the rheometer software (viz., RHEOMETRICS® RHIOS V4.4 or Orchestrator Software) to determine the melt elastic modulus G'(G"=500) at a reference melt viscous modulus (G") value of G"=500 Pa. If necessary, the values were obtained by interpolation between the available data points using the RHEOMETRICS software. The term "Storage modulus", G'(co), also known as "elastic modulus", which is a function of the applied oscillating frequency, co, is defined as the stress in phase with the strain in a sinusoidal deformation divided by the strain; while the term "Viscous modulus", G"(ω), also known as "loss modulus", which is also a function of the applied oscillating frequency, ω, is defined as the stress 90 degrees out of phase with the strain divided by the strain. Both these moduli, and the others linear viscoelastic, dynamic rheological parameters, are well known within the skill in the art, for example, as discussed by G. Marin in "Oscillatory Rheometry", Chapter 10 of the book on Rheological Measurement, edited by A. A. Collyer and D. W. Clegg, Elsevier, 1988.

The evaluation of relative elasticity is based on measurements carried out at low frequencies, which are most relevant for conditions associated with powder sintering and densification in rotomolding. The relative elasticity is evaluated based on the ratio of G' over G" at a frequency of 0.05 rad/s from DMA frequency sweep measurements carried out at 190° C. Data reported in the literature show that resin compositions with a high relative elasticity tend to exhibit processing difficulties in terms of slow powder densification. Wang and Kontopoulou (2004) reported adequate rotomoldability for blend compositions that were characterized with a relative elasticity as high as 0.125. In that study, the effect of plastomer content on the rotomoldability of polypropylene was investigated (W. Q. Wang and M. Kontopoulou (2004) Polymer Engineering and Science, vo. 44, no 9, pp 1662-1669). Further analysis of the results published by Wang and Kontopoulou show that compositions with higher plastomer content exhibited increasing relative elasticity (G'/G">0.13) and correspondingly increasing difficulties in achieving full densification during rotomolding evaluation.

In this disclosure, the LCBF (Long Chain Branching Factor) was determined using the DMA determined $\eta_0$ (see U.S. Pat. No. 10,442,921).

Melt Strength

The melt strength is measured on ROSAND® RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/min$^2$ or 65±15 m/min$^2$. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer. The melt strength stretch ratio is defined as the ratio of the velocity at pulley over the velocity at the exit of the die.

Long Chain Branching Factor (LCBF)

The LCBF (dimensionless) was determined for the bimodal polyethylene composition using the method described in U.S. Pat. No. 10,442,921 which is incorporated herein by reference.

The long chain branching factor (the "LCBF") calculation requires the polydispersity corrected Zero Shear Viscosity ($ZSV_c$) and the short chain branching (the "SCB") corrected Intrinsic Viscosity ($IV_c$) as fully described in the following paragraphs.

The correction to the Zero Shear Viscosity, $ZSV_c$, having dimensions of poise, was performed as shown in equation Eq. (1):

$$ZSV_C = \frac{1.8389 \times \eta_0}{2.4110^{Ln(Pd)}} \quad \text{Eq. (1)}$$

where $\eta_0$, the zero shear viscosity (poise), was measured by DMA as described above; Pd was the dimensionless polydispersity ($M_w/M_n$) as measured using conventional GPC as described above and 1.8389 and 2.4110 are dimensionless constants.

The correction to the Intrinsic Viscosity, $IV_c$, having dimensions of dL/g, was performed as shown in equation Eq. (2):

$$IV_C = [\eta] + \frac{A \times SCB \times M_v^{0.725}}{1000000} \quad \text{Eq. (2)}$$

where the intrinsic viscosity [η] (dL/g) was measured using 3D-SEC described above; the SCB has dimensions of ($CH_3$#/1000C) and was determined using FTIR as described above; $M_w$, the viscosity average molar mass (g/mole), was determined using 3D-SEC as described above, and A was a dimensionless constant that depends on the α-olefin in the ethylene/α-olefin copolymer sample, i.e. A was 2.1626, 1.9772 or 1.1398 for 1-octene, 1-hexene and 1-butene α-olefins, respectively. In the case of an ethylene homopolymer no correction is required for the Mark-Houwink constant, i.e. SCB is zero.

"Linear" ethylene copolymers (or linear ethylene homopolymers), which do not contain LCB or contain undetectable levels of LCB, fall on the Reference Line defined by Eq. (3).

$$\text{Log}(IV_c) = 0.2100 \times \text{Log}(ZSV_c) - 0.7879 \quad \text{Eq. (3)}$$

The calculation of the LCBF was based on the Horizontal-Shift ($S_h$) and Vertical-Shift ($S_v$) from the linear reference line, as defined by the following equations:

$$S_h = \text{Log}(ZSV_c) - 4.7619 \times \text{Log}(IV_c) - 3.7519 \quad \text{Eq. (4)}$$

$$S_v = 0.2100 \times \text{Log}(ZSV_c) - \text{Log}(IV_c) - 0.7879. \quad \text{Eq. (5)}$$

In Eq. (4) and (5), it is required that $ZSV_c$ and $IV_c$ have dimensions of poise and dL/g, respectively. The Horizontal-Shift ($S_h$) was a shift in $ZSV_c$ at constant Intrinsic Viscosity ($IV_c$), if one removes the Log function its physical meaning is apparent, i.e. a ratio of two Zero Shear Viscosities, the $ZSV_c$ of the sample under test relative to the $ZSV_c$ of a linear ethylene copolymer (or a linear ethylene homopolymer) having the same $IV_c$. The Horizontal-Shift ($S_h$) was dimensionless. The Vertical-Shift ($S_v$) was a shift in $IV_c$ at constant Zero Shear Viscosity ($ZSV_c$), if one removes the Log function its physical meaning is apparent, i.e. a ratio of two Intrinsic Viscosities, the $IV_c$ of a linear ethylene copolymer (or a linear ethylene homopolymer) having the same $ZSV_c$ relative to the $IV_c$ of the sample under test. The Vertical-Shift ($S_v$) was dimensionless.

The dimensionless Long Chain Branching Factor (LCBF) was defined by Eq. (6):

$$LCBF = \frac{S_h \times S_v}{2} \quad \text{Eq. (6)}$$

In an embodiment of the disclosure, ethylene polymers (e.g. bimodal polyethylene compositions) having LCB are characterized as having a LCBF ≥0.0010 (dimensionless); in contrast, ethylene polymers having no LCB (or undetectable LCB) are characterized by a LCBF of less than 0.0010 (dimensionless).

Impact Properties

Izod impact performance was determined according to ASTM D256. Izod impact specimens were notched to promote a stress concentration point to induce a brittle, rather than ductile, break. Tensile impact performance was determined according to ASTM D1822.

Tensile Properties

The following tensile properties were determined using ASTM D 638: elongation at yield (%), yield strength (MPa), ultimate elongation (%), ultimate strength (MPa) and 1 and 2% secant modulus (MPa).

Flexural Properties

Flexural properties, i.e., 2% flexural secant modulus was determined using ASTM D790-10 (published in April 2010).

Environmental Stress Crack Resistance, ESCR Plaques molded from the bimodal polyethylene compositions were tested according to the following ASTM methods: Bent Strip Environmental Stress Crack Resistance (ESCR), ASTM D1693; ESCR test under the "B" conditions of ASTM D1693 (at a temperature of 50° C.) were conducted using a 100% solution of IGEPAL CO-630 (nonylphenoxy poly (ethyleneoxy)ethanol, branched; having the formula: 4-(branched-$C_9H_{19}$)-phenyl-$[OCH_2CH_2]_n$—OH, wherein subscript n is 9-10) and using a 10% solution of IGEPAL CO-630. It will be recognized by skilled persons that the test using the 10% solution ("$B_{10}$") is more severe than the test using the 100% solution ("$B_{100}$"); i.e. that $B_{10}$ values are typically lower than $B_{100}$ values.

Plaques molded from the bimodal polyethylene compositions were tested according to the following ASTM methods: Bent Strip Environmental Stress Crack Resistance (ESCR), ASTM D1693; ESCR test under the "A" conditions of ASTM D1693 (at a temperature of 50° C.) were conducted using a 100% solution of IGEPAL CO-630 (nonylphenoxy poly(ethyleneoxy)ethanol, branched having the formula: 4-(branched-$C_9H_{19}$)-phenyl-$[OCH_2CH_2]_n$—OH, wherein subscript n is 9-10) and using a 10% solution of IGEPAL CO-630. It will be recognized by skilled persons that the test using the 10% solution ("$A_{10}$") is more severe than the test using the 100% solution ("$A_{100}$"); i.e. that $B_{10}$ values are typically lower than $A_{100}$ values.

Preparation of Bimodal Polyethylene Composition

The bimodal polyethylene composition was made using a mixed single site catalyst system in an "in-series" dual reactor solution polymerization process. As a result, the bimodal polyethylene composition comprised a first ethylene copolymer made with a first single site catalyst and a second ethylene copolymer made with a second and different single site catalyst. An "in series" dual reactor, solution phase polymerization process, including one employing a mixed single site catalyst has been described in U.S. Pat. Appl. No. 10,442,921. Basically, in an "in-series" dual reactor system the exit stream from a first polymerization reactor (R1) flows directly into a second polymerization reactor (R2).

The R1 pressure was from about 14 MPa to about 18 MPa; while R2 was operated at a lower pressure to facilitate continuous flow from R1 to R2. Both R1 and R2 were continuously stirred reactors (CSTR's) and were agitated to give conditions in which the reactor contents were well mixed. The process was operated continuously by feeding fresh process solvent, ethylene, 1-octene and hydrogen to the reactors and in the removal of product (note however, that 1-octene is only feed to the first reactor). Although no comonomer is feed directly to the downstream second reactor, R2 an ethylene copolymer is nevertheless formed in second reactor due to the significant presence of un-reacted 1-octene flowing from the first reactor to the second reactor where it is copolymerized with ethylene. Methylpentane was used as the process solvent (a commercial blend of methylpentane isomers). The volume of the first CSTR reactor (R1) was 3.2 gallons (12 L), and the volume of the second CSTR reactor (R2) was 5.8 gallons (22 L). Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1. Average residence times for the reactors are calculated by dividing average flow rates by reactor volume and is primarily influenced by the amount of solvent flowing through each reactor and the total amount of solvent flowing through the solution process.

In the first reactor, R1, the following single site catalyst components were used to prepare the first ethylene copolymer: diphenylmethylene(cyclopentadienyl)(2,7-di-t-butylfluorenyl)hafnium dimethide $[(2,7\text{-}tBu_2Flu)Ph_2C(Cp)HfMe_2]$; methylaluminoxane (MMAO-07); trityl tetrakis (pentafluoro-phenyl)borate (trityl borate), and 2,6-di-tert-butyl-4-ethylphenol (BHEB). Methylaluminoxane (MMAO-07) and 2,6-di-tert-butyl-4-ethylphenol are premixed in-line and then combined with diphenylmethylene (cyclopentadienyl)(2,7-di-t-butylfluorenyl)hafnium dimethide and trityl tetrakis(pentafluoro-phenyl)borate just before entering the polymerization reactor (R1). The efficiency of the single site catalyst formulation was optimized by adjusting the mole ratios of the catalyst components and the R1 catalyst inlet temperature.

In the second reactor, R2, the single site catalyst components were used to prepare the second ethylene copolymer: cyclopentadienyltri(tertiarybutyl)phosphinimine titanium dichloride, $(Cp[(t\text{-}Bu)_3PN]TiCl_2)$; methylaluminoxane (MAO-07); trityl tetrakis(pentafluoro-phenyl)borate, and 2,6-di-tert-butyl-4-ethylphenol. Methylaluminoxane (MMAO-07) and 2,6-di-tert-butyl-4-ethylphenol are premixed in-line and then combined with cyclopentadienyltri (tertiarybutyl)phosphinimine titanium dichloride and trityl tetrakis(pentafluoro-phenyl)borate just before entering the polymerization reactor (R2). The efficiency of the single site catalyst formulation was optimized by adjusting the mole ratios of the catalyst components and the R2 catalyst inlet temperature.

The solvents used for the single site catalyst component were as follows: methylpentane was used for the methylaluminoxane and the BHEB components; xylene was used for the active catalyst molecule (i.e. the metallocene and the phosphinimine catalysts) and the trityl borate components.

Polymerization in the continuous solution polymerization process was terminated by adding a catalyst deactivator to the second reactor exit stream. The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of hafnium, titanium and aluminum added to the polymerization process; to be clear, the moles of octanoic acid added=0.5×(moles hafnium+moles titanium+moles aluminum).

A two-stage devolatilization process was employed to recover the polyethylene product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. Ltd., Tokyo, Japan was used as a passivator, or acid scavenger, in the continuous solution process. A slurry of DHT-4V in process solvent was added prior to the first V/L separator.

Prior to pelletization the bimodal polyethylene composition was stabilized by adding about 500 ppm of IRGANOX 1076 (a primary antioxidant) and about 500 ppm of IRGAFOS 168 (a secondary antioxidant), based on weight of the bimodal polyethylene composition. Antioxidants were dissolved in process solvent and added between the first and second V/L separators.

Table 1 shows the reactor conditions used to make an inventive bimodal polyethylene composition. Table 1 includes process parameters, such as the ethylene and 1-octene splits between the reactors (R1 and R2), the reactor temperatures, the ethylene conversions, etc. Table 1 also shows the reactor conditions used to make comparative bimodal polyethylene compositions. The comparative compositions, Comp. Examples 3, 5 and 6 were also made in a dual reactor process, but different polymerization catalysts were used in the first and second reactors (see Table 1).

Comp. Example 3 was made substantially accordingly to U.S. Pat. Appl. No. 63/012,380. During the production of Comp. Example 3 a mixed catalyst system was employed: a phosphinimine single site catalyst, Cp[(t-Bu)$_3$PN]TiCl$_2$, which is known not to produce long chain branching, was used in the first reactor and a Ziegler-Natta catalyst, which also is known not to produce long chain branching was used in the second reactor.

Comp. Example 5 was made substantially according to U.S. Pat. No. 10,023,706. For the production of Comp. Example 5, a mixed catalyst system was employed: a phosphinimine single site catalyst, Cp[(t-Bu)$_3$PN]TiCl$_2$, which is known not to produce long chain branching, was used in the first reactor and a Ziegler-Natta catalyst, which also is known not to produce long chain branching was used in the second reactor.

Example 6 was made substantially according to WO 2020/240401. For the production of Comp. Example 6 a phosphinimine single site catalyst, Cp[(t-Bu)$_3$PN]TiCl$_2$, which is known not to produce long chain branching, was used in each of the first reactor and second reactors.

TABLE 1

Polymerization Conditions

| | Example No. | | | |
|---|---|---|---|---|
| | Example 1 (Inventive) | Example 3 (Comparative) | Example 5 (Comparative) | Example 6 (Comparative) |
| Catalyst in R1 | Metallocene | Phosphinimine | Phosphinimine | Phosphinimine |
| Catalyst in R2 | Phosphinimine | Zielger Natta | Zielger Natta | Phosphinimine |
| Total Solution Rate (TSR) (kg/h) | 550 | 600 | 599 | 600 |
| Ethylene Concentration (wt % overall) | 16.2 | 17.2 | 16.2 | 14.4 |
| 1-Octene to Ethylene Ratio Total | 0.053 | 0.110 | 0.135 | 0.144 |
| Ethylene split between First Reactor (R1) and Second Reactor (R2) | 0.30/0.70 | 0.30/0.70 | 0.25/0.75 | 0.30/0.70 |
| 1-Octene split between First Reactor (R1) and Second reactor (R2) | 1/0 | 1/0 | 1/0 | 1/0 |
| Ethylene Fresh Feed to R1 Concentration (wt %) | 11.4 | 8.9 | 8.6 | 8.8 |
| 1-Octene/Ethylene in Fresh Feed to R1 (g/g) | 0.18 | 0.37 | 0.54 | 0.48 |
| Ethylene Fresh Feed to R2 Concentration (wt %) | 19.8 | 28.6 | 23.0 | 19.8 |
| 1-Octene/Ethylene in Fresh Feed to R2 (g/g) | 0 | 0 | 0 | 0 |
| Hydrogen in Reactor 1 (ppm) | 7.0 | 2.7 | 1.2 | 0.9 |
| Hydrogen in Reactor 2 (ppm) | 15.0 | 17.7 | 24.3 | 2.9 |
| Reactor 1 Temperature (° C.) | 148 | 140 | 138 | 138 |
| Reactor 2 Temperature (° C.) | 210 | 223 | 212 | 210 |
| Reactor 1 Inlet Temperature (° C.) | 25 | 30 | 30 | 30 |
| Reactor 2 Inlet Temperature (° C.) | 25 | 40 | 35 | 40 |
| Ethylene Conversion in Reactor 1 (%) | 79.8 | 91.7 | 91.5 | 89.6 |
| Ethylene Conversion in Reactor 2 (%) | 82.0 | 86.8 | 91.9 | 92.5 |
| Catalyst Feed in Reactor 1 (SSC in ppm) | 1.03 | 0.39 | 0.21 | 0.14 |
| SSC - Al/Group 4 Metal in R1 (mol/mol) | 30 | 65 | 100 | 100 |
| SSC - BHEB/Al in R1 (mol/mol) | 0.4 | 0 | 0 | 0.3 |
| SSC - B/Group 4 Metal in R1 (mol/mol) | 1.2 | 1.2 | 1.1 | 1.2 |
| Catalyst Feed in Reactor 2 (SSC ppm) | 0.41 | — | — | 0.69 |
| SSC - Al/Group 4 Metal in R2 (mol/mol) | 25 | — | — | 25 |
| SSC - BHEB/Al in R2 (mol/mol) | 0.3 | — | — | 0.3 |
| SSC - B/Group 4 Metal in R2 (mol/mol) | 1.2 | — | — | 1.5 |
| Catalyst Feed in R2 (Titanium tetrachloride, $TiCl_4$ in ppm) | — | 6.2 | 4.7 | — |
| ZN - tert-tert-Butyl chloride/ Butyl(ethyl)magnesium in R2 (mol/mol) | — | 1.89 | 2.07 | — |
| ZN - Diethylaluminium ethoxide/$TiC1_4$ in R2 (mol/mol) | — | 1.35 | 1.35 | — |

TABLE 1-continued

| Polymerization Conditions | | | | |
|---|---|---|---|---|
| | Example No. | | | |
| | Example 1 (Inventive) | Example 3 (Comparative) | Example 5 (Comparative) | Example 6 (Comparative) |
| ZN - Triethylaluminium/ $TiCl_4$ in R2 (mol/mol) | — | 0.35 | 0.35 | — |
| ZN - Butyl(ethyl)magnesium/ $TiCl_4$ in R2 (mol/mol) | — | 7.0 | 7.0 | — |
| Polyethylene Production Rate (kg/h) | 77.4 | 103.2 | 94.1 | 84.5 |

The properties of a bimodal polyethylene composition produced according to the present disclosure, Example 1 are provided in Table 2. Table 2 also includes data for several comparative polyethylene resins, Examples 2-6. Example 2 is ROTOTUF® RT748 and is commercially available from Ingenia Polymers. Example 4 is NOVAPOL® TR-0740-U, an ethylene copolymer which is made in the gas phase and is commercially available from NOVA Chemicals Corporation.

TABLE 2

| Polymer Properties | | | |
|---|---|---|---|
| | Example No. | | |
| | Example 1 (Inventive) | Example 2 (Comparative) | Example 3 (Comparative) |
| Density ($g/cm^3$) | 0.9455 | 0.9477 | 0.9404 |
| Melt Index $I_2$ (g/10 min) | 6.54 | 6.94 | 6.75 |
| Melt Index $I_6$ (g/10 min) | 36.2 | 29.4 | 24.7 |
| Melt Index $I_{10}$ (g/10 min) | 78 | | |
| Melt Index $I_{21}$ (g/10 min) | 356 | 205 | 136 |
| Melt Flow Ratio ($I_{21}/I_2$) | 54 | 29.5 | 21.1 |
| Stress Exponent | 1.55 | 1.31 | 1.17 |
| $I_{10}/I_2$ | 12 | | |
| CTREF | | | |
| High Temp. Elution Peak (° C.) | 95.9 | 97.5 | 95.1 |
| Low Temp. Elution Peak (° C.) | 79.8 | | 85.9 |
| $CDBI_{50}$ | 54.8 | | 62.8 |
| HD Fraction - Approx. wt % | 57.9 | 69.5 | 50.8 |
| FTIR | | | |
| Branch Freq/1000 C | 5.0 | | 4.2 |
| Comonomer ID | 1-octene | 1-butene and 1-octene | 1-octene |
| Comonomer Content (mole %) | 1 | C4 and C8 | 0.8 |
| Comonomer Content (wt %) | 3.9 | C4 and C8 | 3.3 |
| Internal Unsat/100 C | 0.008 | 0.001 | 0.002 |
| Side Chain Unsat/100 C | 0.001 | 0 | 0.001 |
| Terminal Unsat/100 C | 0.01 | 0.011 | 0.054 |
| GPC | | | |
| $M_n$ | 20,096 | 22,081 | 22,572 |
| $M_w$ | 65,918 | 72,138 | 62,322 |
| $M_z$ | 183,917 | 177,243 | 117,398 |
| Polydispersity Index ($M_w/M_n$) | 3.3 | 3.3 | 2.8 |
| $M_z/M_w$ | 2.8 | 2.5 | 1.9 |
| GPC-FTIR | | | |
| Comonomer Distribution | Reverse | Reverse | Reverse |
| Mean Melt Strength - 190° C. (cN) | 0.94 | | |
| Mean Stretch Ratio - 190° C. (%) | >1287 | | |
| Hexane Extractables (%) - Plaque | 0.16 | | 0.05 |
| Long Chain Branching Factor by DMA and 3D-SEC (LCBF) | 0.009735 | | |
| Metal Residues | | | |
| Ti (ppm) | 0.287 | | |
| Hf (ppm) | 0.655 | | |

TABLE 2-continued

| Polymer Properties | | | |
|---|---|---|---|
| | Example No. | | |
| | Example 4 (Comparative) | Example 5 (Comparative) | Example 6 (Comparative) |
| Density (g/cm$^3$) | 0.9408 | 0.9381 | 0.9349 |
| Melt Index $I_2$ (g/10 min) | 6.63 | 4.56 | 4.81 |
| Melt Index $I_6$ (g/10 min) | 25.9 | 17.6 | 21.2 |
| Melt Index $I_{10}$ (g/10 min) | | | |
| Melt Index $I_{21}$ (g/10 min) | 156 | 108 | 159 |
| Melt Flow Ratio ($I_{21}/I_2$) | 23.5 | 23.7 | 33.1 |
| Stress Exponent | 1.24 | 1.24 | 1.36 |
| $I_{10}/I_2$ | | | |
| CTREF | | | |
| High Temp. Elution Peak (° C.) | 97.6 | 95.6 | 89.1 |
| Low Temp. Elution Peak (° C.) | broad tail | 83.3 | 85.3 |
| $CDBI_{50}$ | 42.2 | 52.3 | 82 |
| HD Fraction - Approx. wt % | 58.9 | 54.5 | 29 |
| FTIR | | | |
| Branch Freq/1000 C | 5.4 | 5.1 | 6.2 |
| Comonomer ID | 1-hexene | 1-octene | 1-octene |
| Comonomer Content (mole %) | 1.1 | 1.0 | 1.2 |
| Comonomer Content (wt %) | 3.2 | 3.8 | 4.8 |
| Internal Unsat/100 C | 0.001 | 0.003 | 0.027 |
| Side Chain Unsat/100 C | 0.001 | 0.000 | 0.005 |
| Terminal Unsat/100 C | 0.015 | 0.054 | 0.017 |
| GPC | | | |
| $M_n$ | 25,692 | 24,649 | 27,251 |
| $M_w$ | 69,741 | 66,330 | 68,845 |
| $M_z$ | 166,490 | 131,250 | 154,100 |
| Polydispersity Index ($M_w/M_n$) | 2.7 | 2.7 | 2.5 |
| $M_z/M_w$ | 2.4 | 2.0 | 2.2 |
| GPC-FTIR | | | |
| Comonomer Distribution | Normal | Reverse | Reverse |
| Mean Melt Strength - 190° C. (cN) | 0.52 | | |
| Mean Stretch Ratio - 190° C. (%) | 1765.9 | | |
| Hexane Extractables (%) - Plaque | 0.43 | 0.16 | 0.21 |
| Long Chain Branching Factor by DMA and 3D-SEC (LCBF) | 0.000916 | | 0.000258 |
| Metal Residues | | | |
| Ti (ppm) | | 6.50 | |
| Hf (ppm) | | not applicable | |

TABLE 3

| Plaque Properties | | | |
|---|---|---|---|
| | Example No. | | |
| | Example 1 (Inventive) | Example 2 (Comparative) | Example 3 (Comparative) |
| Tensile Properties | | | |
| Elong. at Yield (%) | 11 | 10 | 11 |
| Elong. at Yield Dev. (%) | 0.3 | 0.1 | 0.1 |
| Yield Strength (MPa) | 23.3 | 22.5 | 21.5 |
| Yield Strength Dev. (MPa) | 0.2 | 0.2 | 0.1 |
| Ultimate Elong. (%) | 589 | 928 | 941 |
| Ultimate Elong.Dev. (%) | 48 | 217 | 27 |
| Ultimate Strength (MPa) | 19.2 | 16.5 | 29.3 |
| Ultimate Strength Dev. (MPa) | 3.7 | 3.4 | 0.9 |
| Sec Mod 1% (MPa) | 950 | 961 | 856 |
| Sec Mod 1% (MPa) Dev. | 37 | 28 | 14 |
| Sec Mod 2% (MPa) | 746 | 746 | 667 |
| Sec Mod 2% (MPa) Dev. | 16 | 13 | 5 |
| Flexural Properties | | | |
| Flex Secant Mod. 1% (MPa) | 978 | 933 | 840 |
| Flex Sec Mod 1% (MPa) Dev. | 29 | 10 | 19 |

TABLE 3-continued

| Plaque Properties | | | |
|---|---|---|---|
| Flex Secant Mod. 2% (MPa) | 862 | 821 | 715 |
| Flex Sec Mod 2% (MPa) Dev. | 24 | 10 | 11 |
| Flex Tangent Mod. (MPa) | 1222 | 1050 | 1047 |
| Flex Tangent Mod. Dev. (MPa) | 152 | 133 | 55 |
| Flexural Strength (MPa) | 32.6 | 31.1 | 27.1 |
| Flexural Strength Dev. (MPa) | 0.6 | 0.3 | 0.4 |
| Impact Properties | | | |
| Izod Impact (ft-lb/in) | 7.9 | | 2.5 |
| Tensile Impact (ft-lb/in$^2$) | 200.5 | | 134.7 |
| Tensile Impact Dev. (ft-lb/in$^2$) | 33.8 | | 18.7 |
| ESCR | | | |
| ESCR Cond. A at 10% CO-630 (hrs) | 85 | | 7-21 |
| ESCR Cond. A at 100% CO-630 (hrs) | >1173 | | 31-47 |
| ESCR Cond. B at 10% CO-630 (hrs) | 64 | 42 | 5-22 |
| ESCR Cond. B at 100% CO-630 (hrs) | >1173 | 15 | 51 |

| | Example No. | | |
|---|---|---|---|
| | Example 4 (Comparative) | Example 5 (Comparative) | Example 6 (Comparative) |
| Tensile Properties | | | |
| Elong. at Yield (%) | 11 | 10 | 11 |
| Elong. at Yield Dev. (%) | 0.1 | 0.1 | 0.4 |
| Yield Strength (MPa) | 21.7 | 20.7 | 19.6 |
| Yield Strength Dev. (MPa) | 0.1 | 0.1 | 0.03 |
| Ultimate Elong. (%) | 665 | 811 | 565 |
| Ultimate Elong.Dev. (%) | 56.1 | 14 | 3.2 |
| Ultimate Strength (MPa) | 14.1 | 29.3 | 15.3 |
| Ultimate Strength Dev. (MPa) | 0.1 | 0.8 | 1.5 |
| Sec Mod 1% (MPa) | 910 | 864 | 780 |
| Sec Mod 1% (MPa) Dev. | 17 | 19 | 7 |
| Sec Mod 2% (MPa) | 698 | 656 | 602 |
| Sec Mod 2% (MPa) Dev. | 7 | 9 | 3 |
| Flexural Properties | | | |
| Flex Secant Mod. 1% (MPa) | 897 | 814 | 694 |
| Flex Sec Mod 1% (MPa) Dev. | 19 | 13 | 37 |
| Flex Secant Mod. 2% (MPa) | 766 | 686 | 599 |
| Flex Sec Mod 2% (MPa) Dev. | 16 | 9 | 32 |
| Flex Tangent Mod. (MPa) | 1109 | 1034 | 885 |
| Flex Tangent Mod. Dev. (MPa) | 45 | 34 | 27 |
| Flexural Strength (MPa) | 29 | 27.4 | 24.5 |
| Flexural Strength Dev. (MPa) | 0.6 | 0.2 | 0.9 |
| Impact Properties | | | |
| Izod Impact (ft-lb/in) | 1.4 | | |
| Tensile Impact (ft-lb/in$^2$) | 79.1 | | |
| Tensile Impact Dev. (ft-lb/in$^2$) | 3.6 | | |
| ESCR | | | |
| ESCR Cond. A at 10% CO-630 (hrs) | | 30 | 32 |
| ESCR Cond. A at 100% CO-630 (hrs) | | 1024 | >1009 |
| ESCR Cond. B at 10% CO-630 (hrs) | 7-22 | 92 | 79 |
| ESCR Cond. B at 100% CO-630 (hrs) | 30 | >1679 | >1008 |

FIG. 1 shows that the bimodal polyethylene composition of the present disclosure (Inv. Example 1) has a bimodal GPC profile, while the comparative resins (Comp. Examples 2-5) have a mainly unimodal GPC profile.

Figure 2:
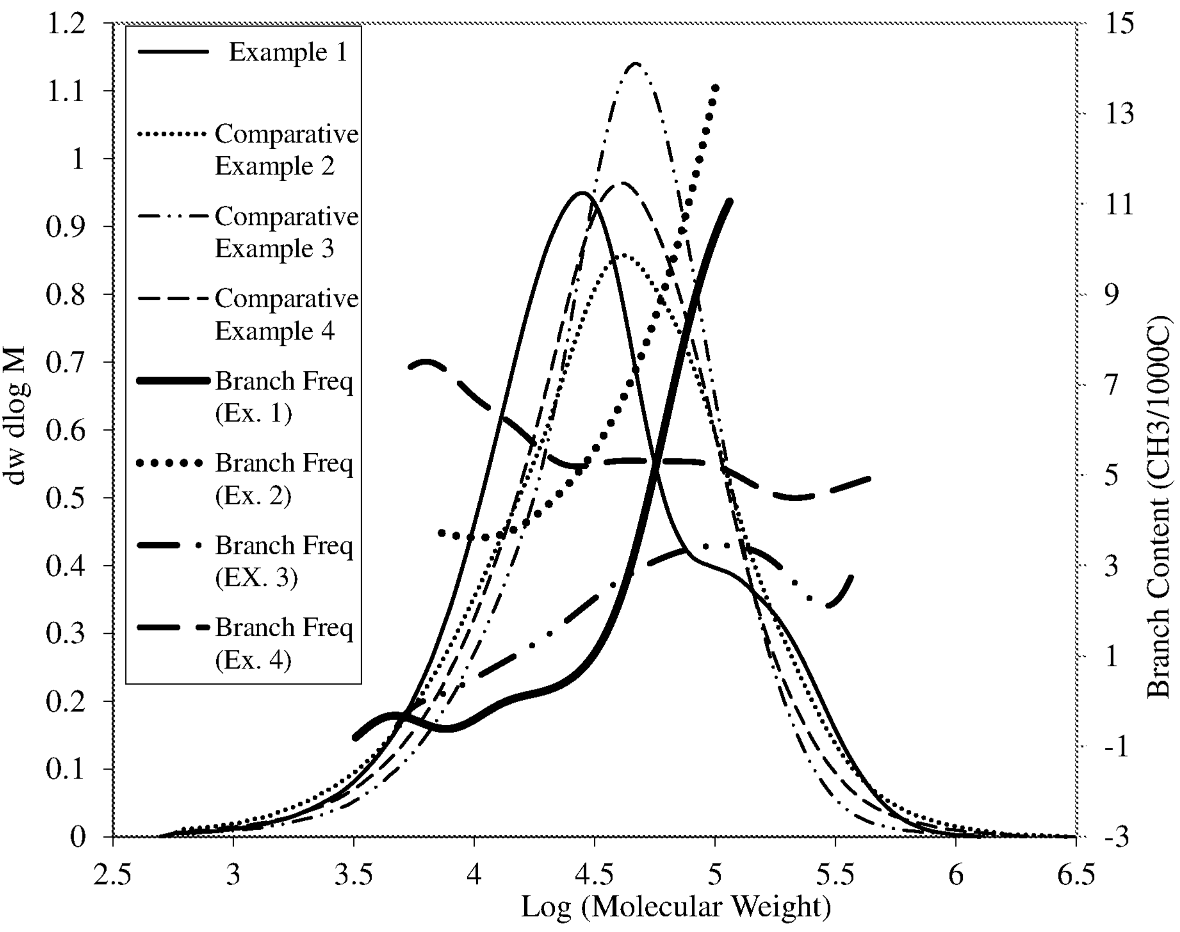
FIG. 2 shows the gel permeation chromatograph with Fourier transform infra-red (GPC-FTIR) detection obtained for a bimodal polyethylene composition made according to the present disclosure as well as for various comparative resins. The comonomer content, shown as the number of short chain branches per 1000 backbone carbons (y-axis), is given relative to the copolymer molecular weight (x-axis). The relatively upwardly sloping line (from left to right) is the short chain branching (in short chain branches per 1000 carbon atoms) determined by FTIR. As can be seen in FIG. 1, for Inventive Example 1, the number of short chain branches is increasing with molecular weight, and hence the comonomer incorporation is said to be "reversed".
Figure 3:
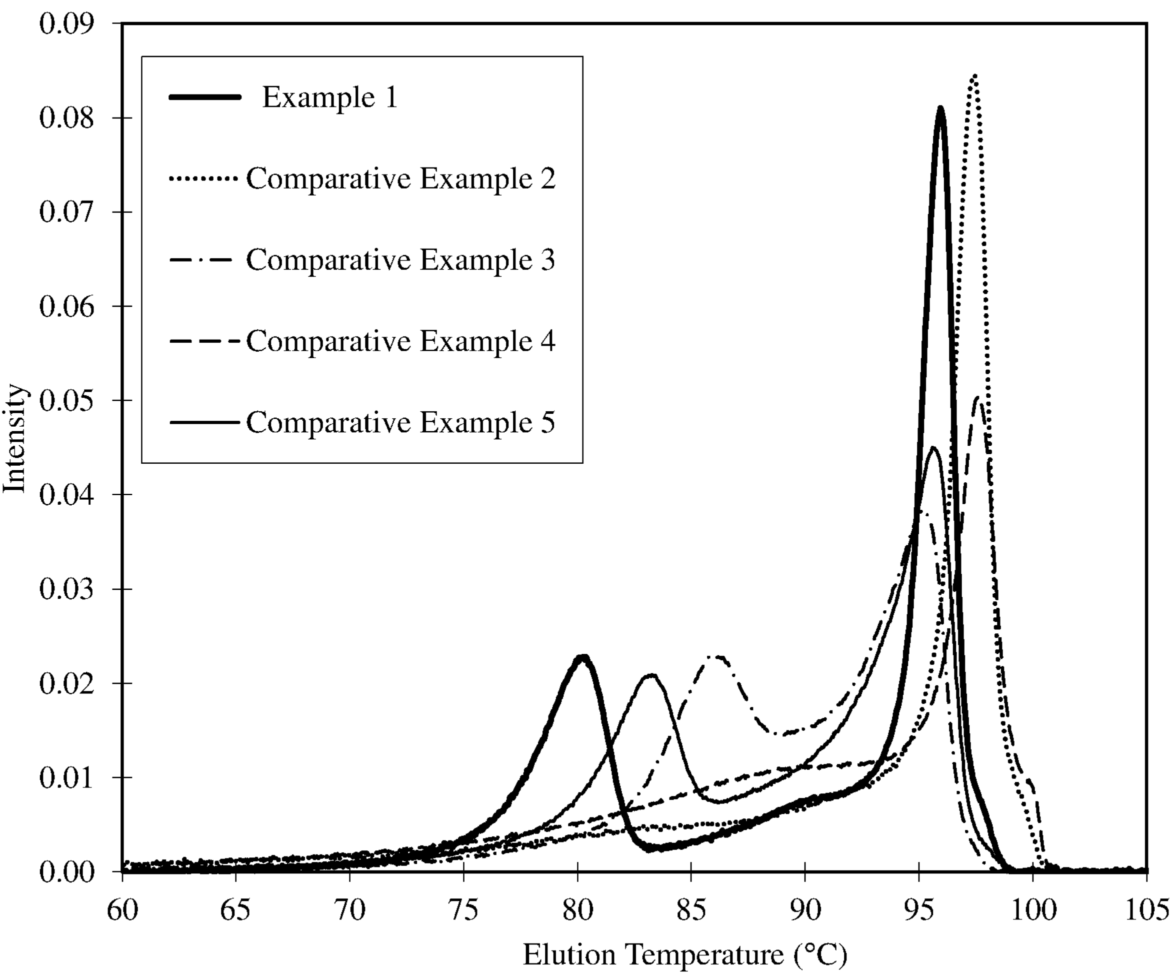
FIG. 3 shows the temperature rising elution fractionation (TREF) profile for a bimodal polyethylene composition made according to the present disclosure as well as for various comparative resins.

FIG. 2 shows the bimodal polyethylene composition of the present disclosure (Inv. Example 1) has a bimodal GPC profile and an increasing amount of commoner (as indicated by the short chain branching content, SCB/1000 backbone carbons atoms). Hence, the comonomer distribution of the Inventive Example 1, can be said to be reversed, and indeed as shown in FIG. 2, is highly reversed (the curved of the SCB/1000 carbons) is steeply increasing with an increase in molecular weight. FIG. 2 shows that the comparative resins (Comp Examples 2, 3 and 4) have largely unimodal GPC profiles and have comonomer distributions ranging from largely flat to highly reverse.

Figure 4:
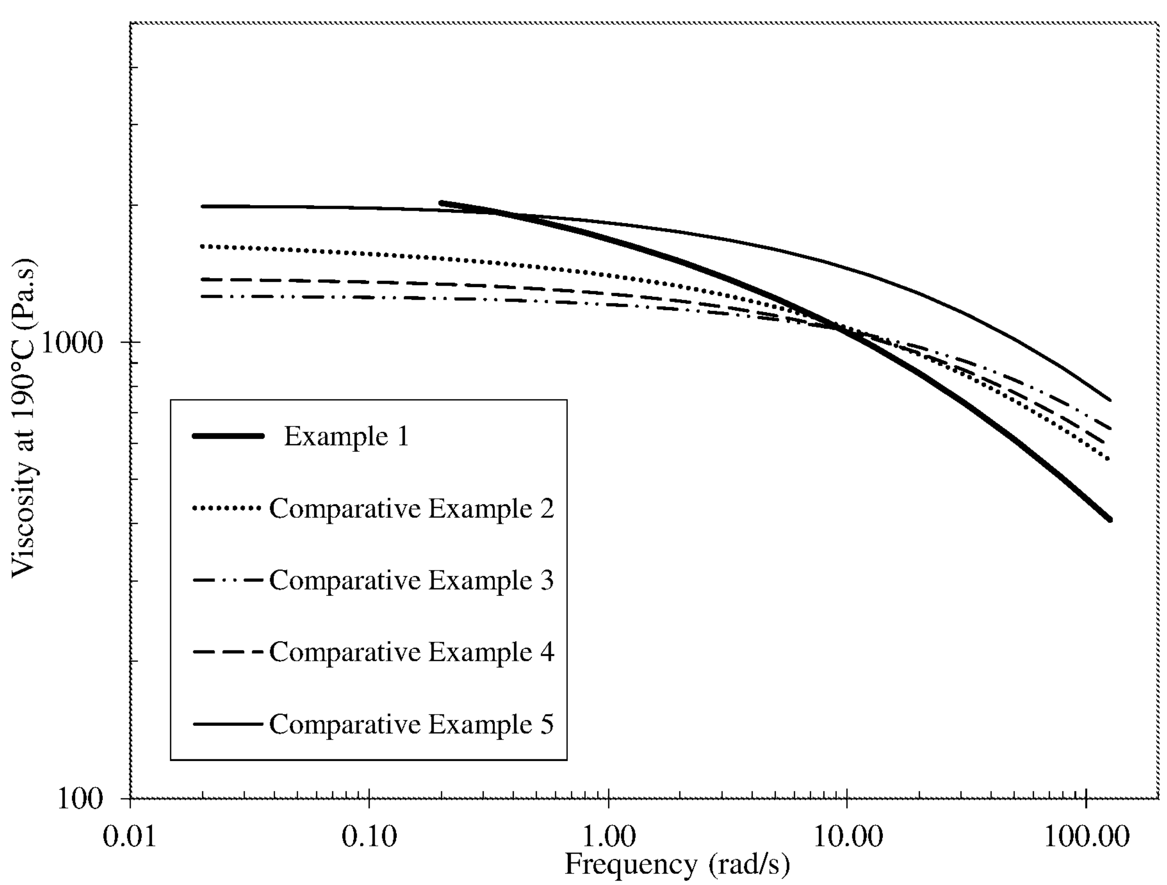
FIG. 4 shows the DMA frequency sweep data (viscosity, $\eta^*$ in Pa·s vs. the frequency, $\omega$ in radians/s) for a bimodal polyethylene composition made according to the present disclosure as well as for various comparative resins.

FIG. 4 presents the viscosity profiles from DMA frequency sweep carried out at 190° C. for the bimodal polyethylene composition of the present disclosure as well as for comparative resins. While all the examples have relatively narrow molecular weight distributions (Mw/Mn ranges from 2.5 to 3.3), their rheological behavior are different. FIG. 4 clearly demonstrates that Inventive Example 1 shows stronger shear thinning behavior relative to Comparative Examples 2-5. The shape of the viscosity profile, in particular the reduction in viscosity with the increasing rate of deformation will have a strong influence on the flow distribution and melt pressure requirements during extrusion and molding applications. For resins with comparable molecular weights and molecular weight distributions, a lower viscosity at higher deformation rates means the resin will be easier to process, requiring lower temperature and extruder torque to achieve high throughput through a die. Similarly, resins with good shear thinning behavior will require lower melt pressures and temperatures to fill a mold cavity. Without wishing to be bound by theory, the difference in shear thinning behavior observed between Inv. Example 1 and Comp. Examples 2-5, is thought to be due to the presence (or amount) of long chain branches in Inv. Example 1. Good shear thinning behavior can be advantageous in applications that are extrusion-rate limited, as well as in mold-filling applications that usually require a resin with high flow characteristics.

As can be seen from the data provided in Tables 2 and 3, the bimodal polyethylene composition of the present disclosure (Inv. Example 1) has flexural secant modulus at 1% value of greater than about 950 MPa, which is higher than that observed for several comparative resins having a similar or lower melt index, $I_2$ and density (Comp. Examples 2-5). The data in Tables 2 and 3 also shows that the bimodal polyethylene composition of the present disclosure (Inv. Example 1) has tensile impact of about 200 ft·lb/in$^2$ and an Izod Impact value of greater than about 5 ft·lb/inch each of which is higher than that found for a couple of comparative resins having similar melt index, $I_2$ and density (Comp. Examples 3 and 4). Finally, Inv. Example 1 has very good ESCR properties as indicated by an ESCR value as determined by ASTM D1693 in 100% IGEPAL CO-630 under condition A or B of greater than 1100 hours. The ESCR values obtained for the bimodal polyethylene composition of the present disclosure (Inv. Example 1) is much better than that obtained for the comparative resins having a similar melt index, $I_2$ and density, Comp. Examples 2, 3 and 4, which had an ESCR value as determined by ASTM D1693 in 100% IGEPAL CO-630 under condition B of 15 hours, 51 hours, and 30 hours, respectively. Indeed, the bimodal polyethylene composition of the present disclosure (Inv. Example 1) has a surprisingly good ESCR performance, as it more closely resembles that obtained for comparative resins having both a lower melt index, $I_2$ and a lower density (See Comp. Example 5 and 6), properties which are known to improve the ESCR performance.

Figure 5:
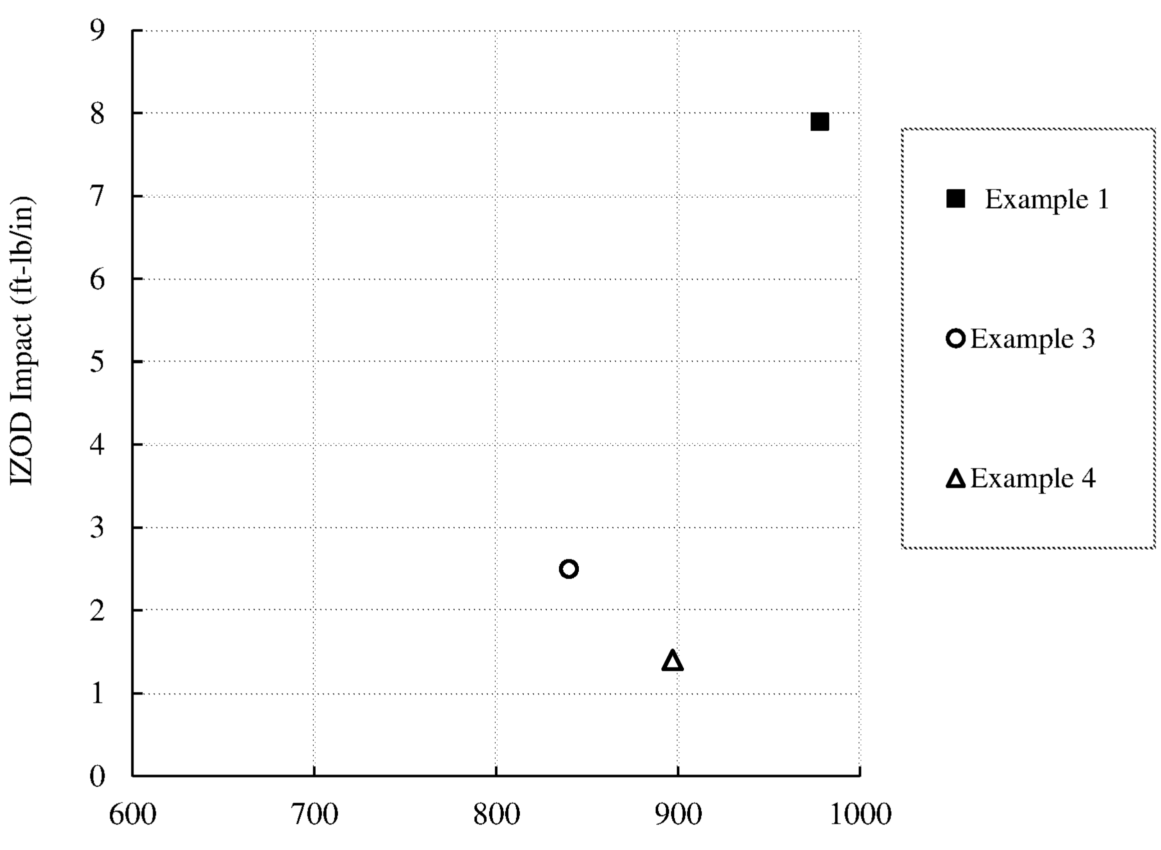
FIG. 5 shows the relationship between two performance indicators (the Izod Impact strength and the Flexural Secant Modulus at 1%) for compression molded plaques made from a bimodal polyethylene composition of the present disclosure as well as from various comparative resins.

FIG. 5 further illustrates the relationship between the toughness (Izod impact) and stiffness (flexural secant modulus 1%) for Inventive Example 1 and Comparative Examples 3 and 4. The plot shows that the bimodal polyethylene composition of the present disclosure has a superior balance of toughness and stiffness relative to Comp. Examples 3 and 4.

Figure 6:
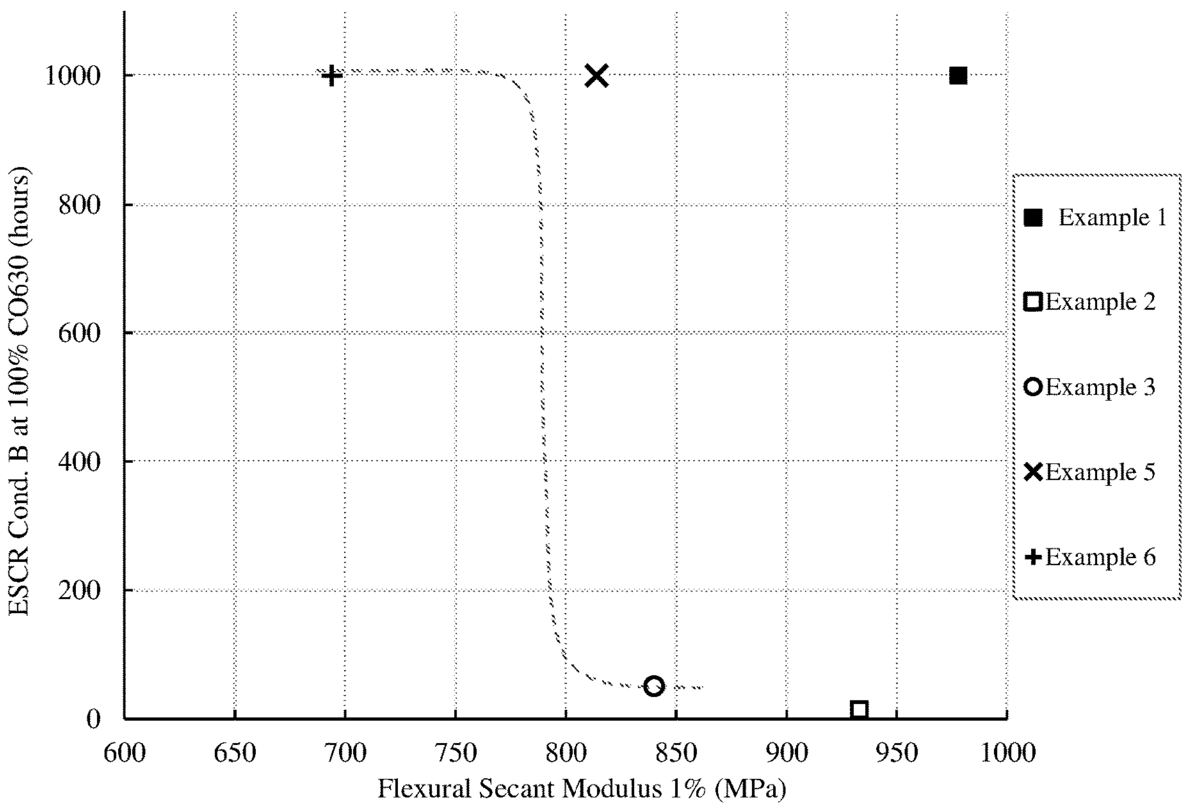
FIG. 6 shows the relationship between two performance indicators (the ESCR Condition B, 100% IGEPAL vs the Flexural Secant Modulus at 1%) for compression molded plaques made from a bimodal polyethylene composition of the present disclosure as well as from various comparative resins.

FIG. 6 further illustrates the relationship between the ESCR and the stiffness (flexural secant modulus 1%) for Inventive Example 1 and Comparative Examples 2, 3, 5 and 6. Note that the ESCR values for examples 5 and 6 are greater than 1000 hours. The ESCR values presented in FIG. 6 for examples 5 and 6 was set at 1000 hours, with the understanding that their respective ESCR performance is actually greater than 1000 hours. The Dashed lines serves to show the general trend in the ESCR for the comparative examples as the stiffness (i.e. the flexural secant modulus 1%) increases. For the comparative examples, the ESCR falls off dramatically as the stiffness increases, while for the inventive examples the ESCR remains high at higher stiffness.

Hence, in view of the data in Tables 2 and 3, as well as FIGS. 5 and 6, a person skilled in the art will appreciate that the bimodal polyethylene composition of the present disclosure provides a good balance of properties, including good melt flow (e.g. melt index), high stiffness (e.g. flexural secant modulus), good impact properties (e.g. Izod and Tensile Impact), and good environmental stress crack resistance.

Bimodal Polyethylene Composition Deconvolution

Mathematical deconvolutions were performed to determine the relative amounts of each of the first and second ethylene copolymers present in a bimodal polyethylene composition, as well as the molecular weights (Mw, Mn, Mz), and comonomer content (the SCB frequency per 1000 polymer backbone carbon atoms) of each of the first and second ethylene copolymers made in the first and second reactors (R1, and R2).

For the deconvolution calculations it was assumed that the single-site catalyzed ethylene copolymer components follow a Flory molecular weight distribution function and they have a homogeneous comonomer distribution across the whole molecular weight range.

Estimates were first obtained from predictions obtained using fundamental kinetic models with kinetic constants specific for each catalyst formulation as well as feed and reactor conditions. The simulation was based on the configuration of a solution pilot plant as described above and which was used to produce the bimodal polyethylene compositions disclosed herein. The kinetic model predictions were used to establish estimates of the short chain branching distribution within the first and second ethylene copolymer components. The estimated values for short branches content were also validated against experimental results obtained from GPC-FTIR for the comonomer distribution. The fit between the simulated molecular weight distribution profile and the actual data obtained from GPC chromatography was improved by modeling the molecular weight distribution as a sum of components which have molecular weight distributions described using multiple-site idealized Flory distributions.

During the deconvolution, the overall Mn, Mw and Mz are calculated using the following relationships: $Mn=1/\Sigma(w_i/(Mn)_i)$, $Mw=\Sigma(w_i\times(Mw)_i)$, $Mz=\Sigma(w_i\times(Mz)_i^2/\Sigma(w_i\times(Mz_i)$ where i represents the i-th component and wi represents the relative weight fraction of the i-th component in the composition.

The following equations were used to calculate the densities and melt index, $I_2$ of each ethylene copolymer component:

$$\rho_1 = 0.978863 - 5.94808\times10^{-3}\left(\frac{SCB}{1000C}\right)^{0.65} - 3.83133\times10^{-4}[\log_{10}(M_n)]^3 - 5.77986\times10^{-6}\left(\frac{M_w}{M_n}\right)^3 + 5.57395\times10^{-3}\left(\frac{M_z}{M_w}\right)^{0.25} \quad \text{Equation (7)}$$

$$\rho_2 = (\rho - w_1\rho_1)/w_2 \quad \text{Equation (8)}$$

$$\log_{10}(\text{Melt Index } I_2) = 7.900 - 3.909\left[\log_{10}\left(\frac{M_w}{1000}\right)\right] - 0.2799\left(\frac{M_w}{M_n}\right)^{-1} \quad \text{Equation (9)}$$

where Mn, Mw, Mz, and SCB/1000C are the deconvoluted values of the individual ethylene polymer components, as obtained from the results of the deconvolution described above, while p is the density of the overall bimodal polyethylene composition and is determined experimentally. Equations (1) and (2) were used to estimate ρ1 and ρ2, the density of the first and second ethylene copolymers, respectively. Equation (3) was used to estimate the melt index, $I_2$ of the first and second ethylene copolymers, respectively. See for example, Alfred Rudin, in *The Elements of Polymer Science and Engineering,* 2nd edition, Academic Press, 1999 and U.S. Pat. No. 8,022,143. The deconvolution results are provided in Table 4.

TABLE 4

Polymer Deconvolution

| | Example No. | |
|---|---|---|
| | Example 1 (Inventive) | Example 6 (Comparative) |
| The First Ethylene Copolymer (Deconvolution) | | |
| Catalyst | SSC (metallocene) | SSC (phosphinimine) |
| Weight fraction (%) | 30% | 28% |
| $M_n$ | 74,777 | 96,048 |
| $M_w$ | 149,554 | 192,096 |
| $M_z$ | 224,331 | 288,144 |
| Polydispersity Index ($M_w/M_n$) | 2.0 | 2.0 |
| Branch Freq/1000 C (SCB1) | 13.6 | 6.9 |
| Density estimate (g/cm$^3$) | 0.9082 | 0.918 |
| Melt Index, $I_2$ estimate (g/10 min) | 0.18 | 0.07 |
| The Second Ethylene Copolymer (Deconvolution) | | |
| Catalyst | SSC (phosphinimine) | SSC (phosphinimine) |
| Weight fraction (%) | 70% | 67% |
| $M_n$ | 13,268 | 18,723 |
| $M_w$ | 26,536 | 37,446 |
| $M_z$ | 39,804 | 56,169 |
| Polydispersity Index ($M_w/M_n$) | 2.0 | 2.0 |
| Branch Freq/1000 C (SCB2) | 0.8 | 2.9 |
| Density estimate (g/cm$^3$) | 0.9615 | 0.944 |
| Melt Index, $I_2$ estimate (g/10 min) | 156.4 | 40.09 |
| Simulated Bimodal Polyethylene Composition (Deconvolution) | | |
| $M_n$ | 17,598 | |
| $M_w$ | 63,331 | |
| $M_z$ | 180,138 | |
| Polydispersity Index ($M_w/M_n$) | 3.6 | |

Non-limiting embodiments of the present disclosure include the following:

Embodiment A. A bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% IGEPAL CO-630 under condition B of greater than 1000 hours.

Embodiment B. The bimodal polyethylene composition of Embodiment A wherein the density of the first ethylene copolymer is less than 0.918 g/cm$^3$.

Embodiment C. The bimodal polyethylene composition of Embodiment A wherein the density of the first ethylene copolymer is less than 0.910 g/cm$^3$.

Embodiment D. The bimodal polyethylene composition of Embodiment A, B, or C wherein the melt index, $I_2$ of the first ethylene copolymer is less than 1.0 g/10 min.

Embodiment E. The bimodal polyethylene composition of Embodiment A, B, C, or D wherein the melt index, $I_2$ of the second ethylene copolymer is ≥20.0 g/10 min.

Embodiment F. The bimodal polyethylene composition of Embodiment A, B, C, or D wherein the melt index, $I_2$ of the second ethylene copolymer is ≥50.0 g/10 min.

Embodiment G. The bimodal polyethylene composition of Embodiment A, B, C, D, E, or F wherein the bimodal polyethylene composition has a molecular weight distribution, $M_w/M_n$ of less than 5.0.

Embodiment H. The bimodal polyethylene composition of Embodiment A, B, C, D, E, or F wherein the bimodal polyethylene composition has a molecular weight distribution, $M_w/M_n$ of from 2.0 to 4.5.

Embodiment I. The bimodal polyethylene composition of Embodiment A, B, C, D, E, F, G, or H wherein the bimodal polyethylene composition has a density of greater than 0.940 g/cm$^3$.

Embodiment J. The bimodal polyethylene composition of Embodiment A, B, C, D, E, F, G, or H wherein the bimodal polyethylene composition has a density of from 0.941 to 0.948 g/cm$^3$.

Embodiment K. The bimodal polyethylene composition of Embodiment A, B, C, D, E, F, G, H, I, or J wherein the bimodal polyethylene composition has a melt index, $I_2$ of greater than 6.0 g/10 min.

Embodiment L. The bimodal polyethylene composition of Embodiment A, B, C, D, E, F, G, H, I, or J wherein the bimodal polyethylene composition has a melt index, $I_2$ of from 6.0 to 12.0 g/10 min.

Embodiment M. The bimodal polyethylene composition of Embodiment A, B, C, D, E, F, G, H, I, J, K, or L wherein the bimodal polyethylene composition has a high load melt index, $I_{21}$ of greater than 250 g/10 min Embodiment N. The bimodal polyethylene composition of Embodiment A, B, C, D, E, F, G, H, I, J, K, or L wherein the bimodal polyethylene composition has a high load melt index, $I_{21}$ of from 250 to 500 g/10 min.

Embodiment O. The bimodal polyethylene composition of Embodiment A, B, C, D, E, F, G, H, I, J, K, L, M, or N wherein the bimodal polyethylene composition has a melt flow ratio, $I_{21}/I_2$ of from 40 to 70.

Embodiment P. The bimodal polyethylene composition of Embodiment A, B, C, D, E, F, G, H, I, J, K, L, M, or N wherein the bimodal polyethylene composition has a melt flow ratio, $I_{21}/I_2$ of from 45 to 65.

Embodiment Q. The bimodal polyethylene composition of Embodiment A, B, C, D, E, F, G, H, I, J, K, L, M, N, O, or P wherein the bimodal polyethylene composition has from 0.0015 to 2.4 ppm of hafnium.

Embodiment R. The bimodal polyethylene composition of Embodiment A, B, C, D, E, F, G, H, I, J, K, L, M, N, O, P, or Q wherein the bimodal polyethylene composition has a long chain branching factor, LCBF of >0.0050.

Embodiment S. The bimodal polyethylene composition of Embodiment A, B, C, D, E, F, G, H, I, J, K, L, M, N, O, P, Q, or R wherein the first ethylene copolymer has from 5 to 30 short chain branches per thousand carbon atoms, SCB1/1000Cs.

Embodiment T. The bimodal polyethylene composition of Embodiment A, B, C, D, E, F, G, H, I, J, K, L, M, N, O, P, Q, R, or S wherein the second ethylene copolymer has 0.1 to 3 short chain branches per thousand carbon atoms, SCB2/1000Cs.

Embodiment U. The bimodal polyethylene composition of Embodiment A, B, C, D, E, F, G, H, I, J, K, L, M, N, O, P, Q, R, S, or T wherein the ratio of the number of short chain branches per thousand carbon atoms in the first ethylene copolymer to the number of short chain branches per thousand carbon atoms in the second ethylene copolymer, SCB1/SCB2 is at least 5.

Embodiment V. The bimodal polyethylene composition of Embodiment A, B, C, D, E, F, G, H, I, J, K, L, M, N, O, P, Q, R, S, or T wherein the ratio of the number of short chain branches per thousand carbon atoms in the first ethylene copolymer to the number of short chain branches per thousand carbon atoms in the second ethylene copolymer, SCB1/SCB2 is at least 10.

Embodiment W. The bimodal polyethylene composition of Embodiment A, B, C, D, E, F, G, H, I, J, K, L, M, N, O, P, Q, R, S, T, U, or V wherein the bimodal polyethylene composition has an Izod impact strength of at least 5.0 foot pounds per inch.

Embodiment X. The bimodal polyethylene composition of Embodiment A, B, C, D, E, F, G, H, I, J, K, L, M, N, O, P, Q, R, S, T, U, V, or W wherein the bimodal polyethylene composition has a flexural secant modulus at 1% of ≥900 Mpa.

Embodiment Y. The bimodal polyethylene composition of Embodiment A, B, C, D, E, F, G, H, I, J, K, L, M, N, O, P, Q, R, S, T, U, V, W, or X wherein the bimodal polyethylene composition has a melt strength of >0.6 cN.

Embodiment Z. A rotomolded article prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% IGEPAL CO-630 under condition B of greater than 1000 hours.

Embodiment AA. The rotomolded article of Embodiment Z wherein said bimodal polyethylene composition contains an additive package comprising: a hindered monophosphite; a diphosphite; a hindered amine light stabilizer; and at least one additional additive selected from the group consisting of a hindered phenol and a hydroxylamine.

Embodiment BB. A cap or closure prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% IGEPAL CO-630 under condition B of greater than 1000 hours.

Embodiment CC. A foamed article prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% IGEPAL CO-630 under condition B of greater than 1000 hours.

INDUSTRIAL APPLICABILITY

A bimodal polyethylene composition has a density of from 0.940 to 0.949 g/cm$^3$, a melt index, $I_2$ of greater than 5 g/10 min and an environmental stress crack resistance, ESCR of greater than 1000 hours. The bimodal polyethylene composition may be used to make molded articles, such as for example, rotomolded articles, or closures for bottles.

The invention claimed is:

1. A bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% branched ethoxylated nonylphenol under condition B of greater than 1000 hours.

2. The bimodal polyethylene composition of claim 1 wherein the density of the first ethylene copolymer is from 0.880 g/cm$^3$ to less than 0.918 g/cm$^3$.

3. The bimodal polyethylene composition of claim 1 wherein the density of the first ethylene copolymer is from 0.880 g/cm$^3$ to less than 0.910 g/cm$^3$.

4. The bimodal polyethylene composition of claim 1 wherein the melt index, $I_2$ of the first ethylene copolymer is less than 1.0 g/10 min.

5. The bimodal polyethylene composition of claim 1 wherein the melt index, $I_2$ of the second ethylene copolymer is ≥20.0 g/10 min.

6. The bimodal polyethylene composition of claim 1 wherein the melt index, $I_2$ of the second ethylene copolymer is ≥50.0 g/10 min.

7. The bimodal polyethylene composition of claim 1 wherein the bimodal polyethylene composition has a molecular weight distribution, $M_w/M_n$ of less than 5.0.

8. The bimodal polyethylene composition of claim 1 wherein the bimodal polyethylene composition has a molecular weight distribution, $M_w/M_n$ of from 2.0 to 4.5.

9. The bimodal polyethylene composition of claim 1 wherein the bimodal polyethylene composition has a density of greater than 0.940 g/cm$^3$ to 0.948 g/cm$^3$.

10. The bimodal polyethylene composition of claim 1 wherein the bimodal polyethylene composition has a density of from 0.941 to 0.948 g/cm$^3$.

11. The bimodal polyethylene composition of claim 1 wherein the bimodal polyethylene composition has a melt index, $I_2$ of greater than 6.0 g/10 min.

12. The bimodal polyethylene composition of claim 1 wherein the bimodal polyethylene composition has a melt index, $I_2$ of from 6.0 to 12.0 g/10 min.

13. The bimodal polyethylene composition of claim 1 wherein the bimodal polyethylene composition has a high load melt index, $I_{21}$ of greater than 250 g/10 min.

14. The bimodal polyethylene composition of claim 1 wherein the bimodal polyethylene composition has a high load melt index, $I_{21}$ of from 250 to 500 g/10 min.

15. The bimodal polyethylene composition of claim 1 wherein the bimodal polyethylene composition has a melt flow ratio, $I_{21}/I_2$ of from 40 to 70.

16. The bimodal polyethylene composition of claim 1 wherein the bimodal polyethylene composition has a melt flow ratio, $I_{21}/I_2$ of from 45 to 65.

17. The bimodal polyethylene composition of claim 1 wherein the bimodal polyethylene composition has from 0.0015 to 2.4 ppm of hafnium.

18. The bimodal polyethylene composition of claim 1 wherein the bimodal polyethylene composition has a long chain branching factor, LCBF of >0.0050.

19. The bimodal polyethylene composition of claim 1 wherein the first ethylene copolymer has from 5 to 30 short chain branches per thousand carbon atoms, SCB1/1000Cs.

20. The bimodal polyethylene composition of claim 1 wherein the second ethylene copolymer has from 0.1 to 3 short chain branches per thousand carbon atoms, SCB2/1000Cs.

21. The bimodal polyethylene composition of claim 1 wherein the ratio of the number of short chain branches per thousand carbon atoms in the first ethylene copolymer to the number of short chain branches per thousand carbon atoms in the second ethylene copolymer, SCB1/SCB2 is at least 5.

22. The bimodal polyethylene composition of claim 1 wherein the ratio of the number of short chain branches per thousand carbon atoms in the first ethylene copolymer to the number of short chain branches per thousand carbon atoms in the second ethylene copolymer, SCB1/SCB2 is at least 10.

23. The bimodal polyethylene composition of claim 1 wherein the bimodal polyethylene composition has an Izod impact strength of at least 5.0 foot pounds per inch.

24. The bimodal polyethylene composition of claim 1 wherein the bimodal polyethylene composition has a flexural secant modulus at 1% of ≥900 Mpa.

25. The bimodal polyethylene composition of claim 1 wherein the bimodal polyethylene composition has a melt strength of >0.6 cN.

26. A rotomolded article prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% branched ethoxylated nonylphenol under condition B of greater than 1000 hours.

27. The rotomolded article of claim 26 wherein said bimodal polyethylene composition contains an additive package comprising: a hindered monophosphite; a diphosphite; a hindered amine light stabilizer; and at least one additional additive selected from the group consisting of a hindered phenol and a hydroxylamine.

28. A cap or closure prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% branched ethoxylated nonylphenol under condition B of greater than 1000 hours.

29. A foamed article prepared from a bimodal polyethylene composition comprising:

(i) from 10 to 60 weight percent of a first ethylene copolymer having a density of from 0.880 to 0.920 g/cm$^3$, a molecular weight distribution, $M_w/M_n$ of from 1.7 to 2.7, and a weight average molecular weight, $M_w$ of from 100,000 to 250,000 g/mol;

(ii) from 90 to 40 weight percent of a second ethylene copolymer having a density of from 0.945 to 0.965 g/cm$^3$, a molecular weight distribution, $M_w/M_n$ of from 1.7 to 2.3, and a weight average molecular weight, $M_w$ of from 15,000 to 75,000 g/mol;

wherein the bimodal polyethylene composition has a density of from 0.940 to 0.949 g/cm$^3$; a melt index, $I_2$ of greater than 5.0 g/10 min, a long chain branching factor, LCBF of greater than 0.0010, and an environmental stress crack resistance, ESCR as determined by ASTM D1693 in 100% branched ethoxylated nonylphenol under condition B of greater than 1000 hours.

* * * * *